United States Patent
Beneteau et al.

[11] Patent Number: 6,119,070
[45] Date of Patent: Sep. 12, 2000

[54] METHOD FOR ACOUSTICALLY MEASURING A FLUID FLOW RATE

[75] Inventors: Lionel Beneteau, Fontenay aux Roses; Benoit Froelich, Marly le Roi, both of France

[73] Assignee: Schlumberger Industries, S.A., Montrouge, France

[21] Appl. No.: 09/046,481

[22] Filed: Mar. 23, 1998

[30] Foreign Application Priority Data

Sep. 25, 1995 [FR] France ................................ 95 11221

[51] Int. Cl.[7] ............................................. G01F 1/66
[52] U.S. Cl. ................................... 702/45; 702/48
[58] Field of Search .................. 702/45, 48, 50, 702/54; 73/861.28

[56] References Cited

U.S. PATENT DOCUMENTS

| | | | |
|---|---|---|---|
| 4,345,479 | 8/1982 | Loveland | 73/861.28 |
| 4,372,166 | 2/1983 | Loveland | 73/861.28 |
| 4,509,372 | 4/1985 | Mount | 73/861.28 |
| 5,035,147 | 7/1991 | Woodward | 73/861.28 |
| 5,178,018 | 1/1993 | Gill | 73/861.28 |

*Primary Examiner*—Marc S. Hoff
*Assistant Examiner*—Craig Steven Miller
*Attorney, Agent, or Firm*—Leonard W. Pojunas

[57] ABSTRACT

A method for measuring a fluid flow rate between two points of a fluid flow according to which a measurement of the respective propagation times of two acoustic signals transmitted in opposite directions is combined with a measurement of acoustic phase shifts respectively induced in each signal. Each received signal is sampled and digitized and the corresponding acoustic phase shift is determined by synchronous detection. During successive iterations, a programmable phase shift dependent on the value of the acoustic phase shift obtained by synchronous detection in the previous iteration is determined for each iteration, so that the result of the synchronous detection step in the current iteration is as close as possible to zero, and the acoustic phase shift is therefore substantially the same as the last programmable phase shift.

24 Claims, 12 Drawing Sheets

$R(1)=0$
$R(2)=TAC/48$
$R(12)=11Tac/48$

METHOD FOR ACOUSTICALLY MEASURING A FLUID FLOW RATE

BACKGROUND OF THE INVENTION

1. Field of the Invention

The invention concerns a method for measuring a fluid flow rate between two points spaced in the direction of a fluid flow according to which the flow rate is obtained by combining a measurement of the propagation times of two acoustic signals transmitted between the two points in opposing directions with a measurement of the acoustic phase shifts induced in each acoustic signal via the propagation of each of said acoustic signals in the flow.

2. DESCRIPTION OF THE RELATED ART

For a large number of years, the flow rate of a fluid (or its volume) flowing in a pipe is measured by using the propagation of acoustic signals transmitted between two acoustic transducers situated at points spaced in the direction of the flow of the fluid.

In principle, an acoustic signal transmitted from the first transducer to the second transducer is received by this second transducer and the propagation time $T1$ of this acoustic signal is measured.

Similarly, the propagation time $T2$ of an acoustic signal transmitted from the second transducer to the first transducer is measured after said signal has been received by this first transducer.

The flow rate of the fluid Q in a pipe can then be written as follows:

$$Q=(SL/2)(T2-T1)/T1T2,$$

where S denotes the mean passage section available to the flow between the two acoustic transducers and L denotes the distance separating the transducers.

Now, the precise measurement of the propagation time of an acoustic signal can be relatively complex to implement, this depending on the accuracy sought.

For these reasons, the phase measuring method is preferable to the method for solely measuring the propagation time as the phase measurement is able to more simply obtain the desired precision concerning the measurement of the flow rate. The European patent application no 0426309 moreover describes a method for measuring the flow rate of a fluid and able to be used in a fluid counter and combining a measurement of the propagation times of two acoustic signals transmitted between two points spaced in the direction of the flow of the fluid in opposing directions with a measurement of the acoustic phase shifts induced in each acoustic signal via the propagation of each of said acoustic signals in the flow.

The flow rate of the fluid Q in a pipe can be written as follows:

$$Q=(SL/4\pi Fac)(2\pi[Fac(T2-T1)]+(\phi 2-\phi 1))/T1T2,$$

where $T1$ and $T2$ respectively represent the propagation times of an acoustic signal transmitted in a downstream direction and in the upstream direction of the flow of the fluid, $\phi 1$ and $\phi 2$ respectively the acoustic phase shifts induced in each of the acoustic signals on account of the propagation of these signals and Fac represents the frequency of said acoustic signals.

This expression reveals a first term, $2\pi[Fac(T2-T1)]$, which determines the number of whole periods existing in the difference of the propagation times. The expression [x] denotes the entire portion of x. A second term, $\phi 2-\phi 1$, determines the precise phase shift between $-2\pi$ and $2\pi$ which affects the acoustic signal at the time it propagates and which is due to the presence of a fluid flow rate between the transducers. This second term makes it possible to refine the measurement and thus obtain a more precise flow rate measurement. The quantity $T1T2$, which appears to the denominator of the formula of the flow rate, corresponds to the square of the mean propagation time of the acoustic waves transmitted in the upstream and downstream directions.

Given the fact that $T1=L/c-v$ and $T2=L/c+v$, where c and v respectively represent the propagation speed of the acoustic signal and the speed of the fluid, and as the propagation speed of the signal mainly depends on the temperature which varies slightly during the flow rate measurements, the term $T1T2$ varies slightly for a given fluid composition and accordingly this term is not recalculated on each new measurement.

In this document, a first measurement of a propagation time of an acoustic signal is carried out by inverting the phase of a specific location of the transmission signal and by detecting on the signal received the moment corresponding to this phase inversion. The detection of this moment is effected with the aid of an instantaneous phase detector. This measurement carried out in the upstream and downstream directions provides the first term of the expression indicated above: $2\pi[Fac(T2-T1)]$.

After having sampled the signal receiver in eight capacitors and digitally converted said sampled signal, the measurement of the acoustic phase shift is effected by carrying out a synchronous detection of this digitalized signal, which makes it possible to determine the phase shift $\phi 1$ or $\phi 2$ which is interpreted as the phase difference between the phase of the sampled signal and the phase of the reference signal.

After having determined the acoustic phase shifts corresponding to the downstream $\phi 1$ and upstream $\phi 2$ directions according to this method, the term $\phi 2-\phi 1$ is determined by the difference.

Thus, by adding the two terms $2\pi[Fac(T2-T1)]$ and $\phi 2-\phi 1$, the fluid flow rate is determined more accurately than previously.

However, in certain applications where the energy consumption needs to be as small as possible, especially because the energy source is a battery and its period of life is limited, it is essential to reduce this consumption to a minimum.

In addition, this method for determining the fluid flow rate is rather complicated to implement and requires significant digital calculation volumes.

BRIEF SUMMARY OF THE INVENTION

The present invention thus concerns a method for measuring a fluid flow rate whose energy consumption is lower with respect to the known methods of the prior art.

Therefore, the present invention concerns a method for measuring a fluid flow rate between two points spaced in the direction of a flow of the fluid according to which the flow rate is obtained by combining a measurement of the respective propagation times of each of the two acoustic signals transmitted between the two points in opposing directions with a measurement of respectively the phase shifts induced in each acoustic signal via the propagation of each of said acoustic signals in the flow, the measurement of the acoustic phase shift induced in each acoustic signal consisting of sampling said acoustic signal received at a sampling frequency, of digitalizing the sampled signal and determining via synchronous detection the acoustic phase shift as being the phase difference between the phase of the sampled signal and the phase of a reference signal, characterized in that said method commences via successive iterations on the various acoustic signals transmitted successively in the same propagation direction whilst introducing at the time of a iteration of an order n+1 in one of said signals between the signal transmission stage and the synchronous detection stage at least one programmable phase shift $\tau p(n)$ tied to the value of the acoustic phase shift $\phi(n)+\phi ref$ determined by the synchronous detection made at the time of the preceding iteration of order n on the signal previously transmitted and which is equal to firstly the sum of the phase difference $\phi err(n)$ between the phase of the signal sampled at the time of the preceding iteration of order n and the phase of the reference signal, and secondly of the programmable phase shift introduced at the time of the iteration of order n, $2\pi Fac\tau p(n-1)$ where Fac represents the frequency of the acoustic signal and $\tau p(n-1)$ represents the programmable delay determined on the iteration of order n-1 so that the synchronous detection stage of the iteration of order n+1 determines a phase difference $\phi err(n+1)$ between the phase of the signal sampled at the time of the current iteration and the reference phase which is as close as possible to zero, the acoustic phase shift $\phi(n+1)+\phi ref$ being approximately equal to the programmable phase shift introduced at the time of the iteration of order n+1, $2\pi Fac\tau p(n)$.

This method is simple to implement and highly flexible in use.

In fact, the programmable phase shift, which actually is a delay introduced into the signal, can be therefore allocated to said signal in the stage of the method desired without changing the nature and reduce the effectiveness of said method.

The programmable phase shift may advantageously introduced at the time of the sampling stage into the sampling signal.

Furthermore, during the synchronous detection stage, the digitalized signal is multiplied by reference signals having the respective shape of a reference sine and a cosine possessing a reference phase, and the programmable phase shift can then be introduced into the reference sine and cosine.

It is also possible to provide that the programmable phase shift is introduced during the transmission stage of the method into a transmission signal intended to generate the corresponding acoustic signal.

So as to reduce the energy consumption, independent heterodyning is effected on the received acoustic signal by mixing said received signal with a mixing signal so as to obtain a mixed signal whose frequency is reduced and the programmable phase shift can then be introduced into the mixing signal.

According to one characteristic of the invention, the programmable phase shift is broken down into at least two programmable sub-phase shifts introduced into the signal, each in a separate stage of the method between the stage for transmission of the acoustic signal and the synchronous detection stage.

Each programmable sub-phase shift is preferably determined by carrying out the Euclidean division of the programmable phase shift with respect to the modulus of the resolution of the programmable static phase shifter associated with the stage corresponding in which said sub-phase shift is to be introduced.

For example, the programmable phase shift is broken down into two programmable sub-phase shifts introduced respectively into the sampling signal and in the reference sine and cosine.

So as to further resolve the problems of energy consumption, the sampling frequency Fe is equal to 4Fac/2n+1 where Fac represents the frequency of the acoustic signal and n is a whole number greater than or equal to zero.

With the sampling frequency Fe selected equal to 4Fac, the programmable phase shift broken down into two programmable sub-phase shifts introduced respectively into the sampling signal and into the reference sine and cosine is approximately equal to $m(Fac/Fq)360°+k(Fac/Fe)360°$ where $(Fac/Fq)360°$ represents the resolution of the programmable phase shift associated with the reference sine and cosine and $(Fac/Fe)360°$ represents the resolution due to sampling, Fq representing the highest frequency of a clock used to implement said method.

So as to further reduce the energy consumption of the method by reducing the calculation time and volume, the sampling frequency Fe is equal to 4Fac/2n+1 with n strictly greater than zero.

The sampling and digitalization stages are preferably carried out simultaneously.

Furthermore, as the fluid flow rate is expressed according to the ratio of a first term which is equal to firstly the sum of $2\pi[Fac(T2-T1)]$ where $[x]$ denotes the whole portion of x and where T1 and T2 are the respective propagation times of the acoustic signals transmitted in the two propagation directions, Fac being the frequency of the acoustic signals, and secondly of the difference of the acoustic phase shifts induced in each signal on a second term equal to the product of said propagation times, the propagation times are measured by a different method for each of the first and second terms.

The propagation times of the acoustic signals are measured in the first term more frequently than for those of the second term.

The propagation times of the acoustic signals are measured in the second term when the average of the propagation times transmitted in the two directions of propagation and expressed in the first term exceeds a predetermined threshold.

The propagation times of the acoustic signals is measured in the second term when the number of acoustic phase shift measurements reaches a predetermined maximum number.

The propagation times of the acoustic signals are measured in the second term when the first of the two preceding conditions is satisfied.

So as to measure the propagation time of the acoustic signals transmitted in the two directions of propagation in the first term, for each signal said signal received is adjusted, the envelope of this received signal is shaped and said propagation time is determined by marking the moment of passage of said envelope by a predetermined threshold.

So as to measure the propagation time of the acoustic signals transmitted in the two directions of propagation in the second term, the values of the amplitudes of each of said acoustic signals are compared with the points sampled at a threshold value and the first sampled point of the signal is looked for whose value is greater than said threshold value and, on the basis of this point, the next or final passage to zero of the signal is then looked for which therefore determines the propagation time of said acoustic signal at an almost constant time which is the same for the two propagation times.

So as to look for the next passage of the signal to zero, the next two consecutive sampled points are looked for, said points framing the point of the signal whose amplitude value is nil, this being then followed by a straight-line interpolation between these two points so as to determine the propagation time of the acoustic signal.

According to one embodiment variant of the invention, on each iteration with order n, an additional programmable delay R(n) is added to the programmable delay τp(n) which shall induce on several successive iterations a phase error E due to the folding back of harmonic lines after sampling distributed according to a nil average periodic law.

Thus, by imposing an additional programmable delay, the error shall be distributed according to a nil average sineoidal law and shall therefore be compensated on several successive acoustic shots.

BRIEF DESCRIPTION OF THE DRAWINGS

Other characteristics and advantages shall appear on reading of the following description, given by way of non-restrictive example, with reference to the accompanying drawings on which.

DETAILED DESCRIPTION OF THE INVENTION

Figure 1:
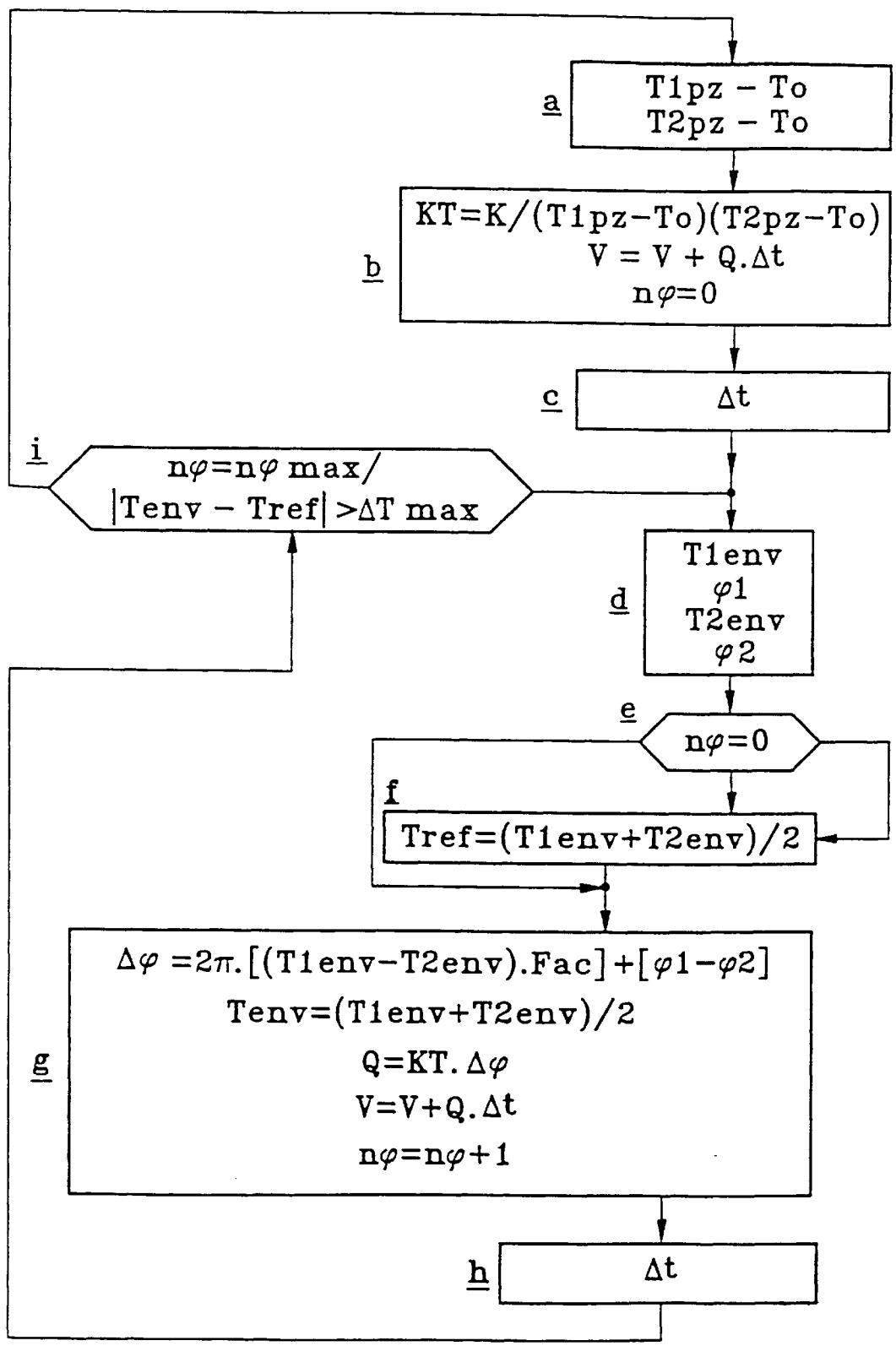
FIG. 1 is a flowchart representing the various stages of the method according to one embodiment of the invention.

FIG. 1 shows a flowchart comprising the various stages of the method for measuring a fluid flow rate on flowing into a pipe, such as a gas, between two points spaced in the direction of the flow of the fluid according to one embodiment of the invention.

The stages of the method are marked on FIG. 1 by the letters a to i. When a gas flows in a pipe between two ultrasonic transducers spaced in the direction of this flow by a distance L, the gas flow rate in this pipe is written:

$$Q=(SL/4\pi Fac)(2\pi[Fac(T2-T1)]+(\phi 2-\phi 1))/T1T2$$

where S denotes the mean passage section available to the flow between the tow points, T1 and T2 respectively representing the propagation times of an acoustic signal transmitted downstream and upstream of the gas flow, $\phi 2$ and $\phi 1$ respectively representing the acoustic phase shifts induced in each of the acoustic signals owing to the propagation of these signals and Fac represents the frequency of these acoustic signals.

This expression of the flow rate corresponds to the ratio of a first term, namely+($\phi 2-\phi 1$) where [x] denotes the whole portion of x, on a second term T1T2 which is equal to the product of the propagation times.

The first term is equal to the sum of firstly $2\pi[Fac(T2-T1)]$ which determines the number of whole periods existing in the difference of the propagation times T2−T1 constituting an approximate measurement of the propagation time, and secondly of ($\phi 2-\phi 1$) which determines the difference of the acoustic phase shifts induced in each signal.

Given the fact that T1=L/c−v and T2=L/c+v where c and v respectively represent the propagation speed of the acoustic signal and the speed of the gas, and as the propagation speed mainly depends on the temperature which varies slightly during the flow rate measurements, the term T1T2 varies slightly for a given gas composition and accordingly this term is recalculated with a lower frequency than for the first term.

However, when this second term is calculated, a measurement is made of the propagation times T1 and T2 by a method differing from the one used for the propagation times featured in the first term.

In fact, in the first term, only the difference of the propagation times intervenes, that is when a relative measurement (at an approximate constant) of these times is sufficient. Moreover, the precision required in this case is slight (about several microseconds) since one is interested in the whole portion of Fac(T2−T1).

On the other hand, in the second term, this concerns the absolute measurement of the propagation times and accordingly the precision obtained for this measurement is directly brought forward to the flow rate measurement precision (it is thus necessary to avoid having an offset concerning the measurement).

For example, if the sought-after precision concerning the flow rate is 1%, precision concerning the measurement of the propagation times needs to be close to 0.5% which corresponds to an error of less than 2 $\mu s$ concerning the propagation times with the gases and the lengths L between two normal transducers (ex: 150 mm for methane).

Thus, the expression of the gas flow rate may be written as follows:

$$Q=(SL/4\pi Fac)(2\pi[Fac(T2env-T1env)]+(\phi2-\phi1))/(T1pz-T0)(T2pz-T0)$$

in which the propagation times T1env and T2env are measured by the envelope method and the propagation times T1pz and T2pz are measured by the passage to zero method, T0 denoting the constant to be cut out so as to obtain the propagation time in the gas. These two methods are subsequently explained in detail.

It is advantageous to use these two different methods for measuring the propagation times rather than carry out all the measurements solely by the passage to zero method, given the fact that this latter method consumes more energy than the envelope method.

With reference again to FIG. 1, the stage a describes a stage in which an ultrasonic signal is transmitted downstream from the first transducer to the second one and the propagation time (T1pz−T0) of this ultrasonic signal is determined by the passage to zero method.

Similarly, an ultrasonic signal is transmitted upstream, that is with a counter-current, from the second transducer to the first one and the propagation time (T2pz−T0) of this signal is determined by the same method as previously.

In stage b, on the basis of the values (T1pz−T0) and (T2pz−T0) calculated, the coefficient is calculated, said coefficient now to be regarded as a constant during a certain number of "shots" (transmissions of ultrasonic signals), KT=K/(T1pz−T0)(T2pz−T0) where K=SL/4πFac.

At the time of the final shots, a gas volume V(n−2) has been accounted for and the flow rate Q(n−2) has been measured. If it is assumed that the flow rate has not varied since the final shots, then Q(n−1)=Q(n−2) and the volume V(n−2) is incremented by the volume Q(n−1)Δt where Δt represents the time elapsed between two consecutive shots in the same direction which furnishes the incremented volume V(n−1)=C(n−2)+Q(n−1)Δt.

A parameter n$\phi$, which represents the number of phase shift measurements made since the last measurement of the propagation times (T1pz−T0) and (T2pz−T0) is then initialized to zero.

Stage c consists of wait for the time Δt until the next stage.

During the next stage d, an ultrasonic signal is transmitted downstream from the first transducer to the second one and the propagation time T1env of this signal is determined by the envelope method, followed by a measurement of the ultrasonic phase shift $\phi1$ which has been induced in said signal owing to its propagation in the gas flow between the two transducers.

The principle of the phase shift measurement shall be described subsequently in more detail.

Similarly, an ultrasonic signal is transmitted upstream from the second transducer to the first one and the propagation time T2env of this signal is determined followed by a measurement of the corresponding ultrasonic phase shift $\phi2$ induced in said signal.

When this stage has been carried out, a test is carried out in stage e to know if the parameter n$\phi$ is equal to zero. If, as this has been described in stage b, n$\phi$=0, that is if this concerns the first phase shift measurements made since the last measurements of the propagation times (T1pz−T0) and (T2pz−T0), a parameter Tref=(T1env+T2env)/2 is then fixed which represents the average of the propagation times corresponding respectively to the upstream and downstream shots (stage f).

On the other hand, if n$\phi$ #0, one moves to the next stage g in which the first term 2π[Fac(T2env−T1env)]+($\phi2-\phi1$) is determined on the basis of the preceding measurements of T1env, $\phi1$, T2env, $\phi2$.

Next, the gas flow rate Q(n) is calculated as being equal to the product of the first term recently determined by the term KT determined in stage b. The gas volume accounted for up until now, V(n−1), is then incremented by the volume Q(n)Δt, namely V(n)=V(n−1)+Q(n)Δt.

A parameter Tenv=(T1env+T2env)/2 is fixed which represents the average carried out on the final propagation times measured respectively according to the upstream and downstream shots and the parameter n$\phi$ is incremented.

Stage h consists of waiting for the time Δt before the next stage.

During stage i, a test is conducted on each of the two parameters n$\phi$ and Tref so as to know if firstly n$\phi$ reaches a predetermined maximum number of phase shift measurements n$\phi$max, and secondly & Tenv−Tref | exceeds a predetermined threshold ΔTmax.

The second condition has been established so as to check if the propagation medium undergoes a sudden modification, such as from the nature of the gas or temperature.

If none of these two conditions is satisfied, this means that the threshold n$\phi$max has not been reached and that the propagation medium has not suddenly varied. in this case, the stages d to i are carried out again. On the other hand, if at least one of the two conditions is satisfied, the stages a to i are carried out again.

Figure 2:
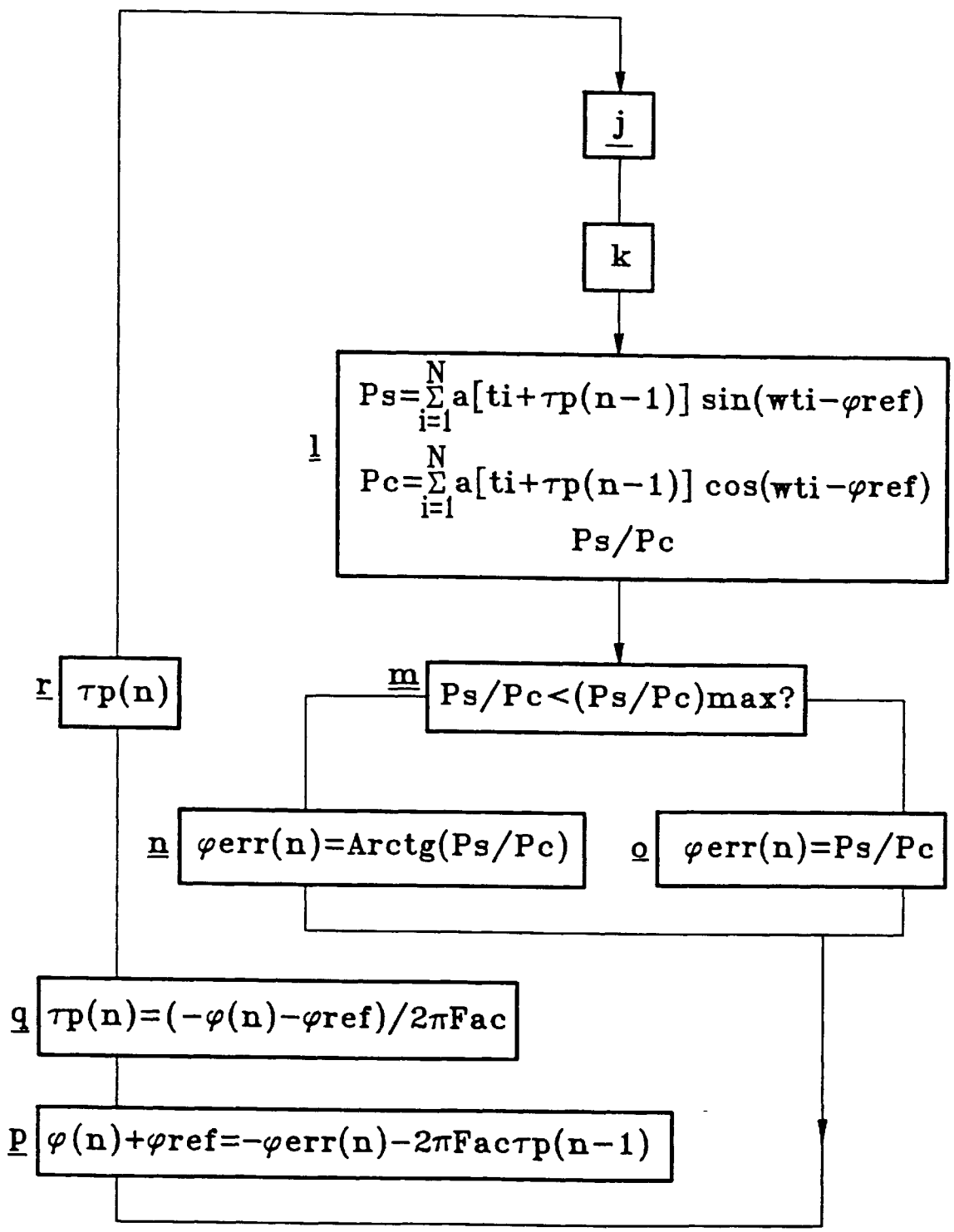
FIG. 2 is a flowchart representing the various stages of the method and implemented on reach acoustic signal transmission and included in the acoustic phase shift measuring stage represented by stage d on FIG. 1.

The principle of the phase shift measurement shall now be described with reference to FIG. 2 representing the various stages of the measurement method of the invention and which are included in stage d of FIG. 1.

So as to measure the ultrasonic phase shift induced in an ultrasonic signal owing to its propagation in the gas flow between the two transducers, this is carried out by successive iterations, FIG. 2 representing one of these iterations which takes place for each ultrasonic "shot" carried out in a given propagation direction. The successive iterations are carried out in parallel for the two directions of propagation but independently for each direction.

For the order 1 iteration, when an ultrasonic shot has been carried out from one of the transducers, for example towards downstream (stage i), the ultrasonic signal allocated to the corresponding ultrasonic phase shift to be measured is received by the other transducer.

During the acquisition stage k, this signal is sampled at a sampling frequency and digitalized simultaneously.

During the stage , which corresponds to a first stage of the synchronous detection operation, the sampled and digitalized signal is multiplied by reference signals having the respective shape of a reference sine sin(wtj−$\phi$ref) and a reference cosine cos(wtj−$\phi$ref) both having a given reference phase $\phi$ref.

For N sampled points, the following calculations are made during synchronous detection:

$$ps = \Sigma a(ti) \times \sin(wtj - \phi ref)$$

$$pc = \Sigma a(ti) \times \cos(wtj - \phi ref)$$

where a(ti): represents the value obtained at the point i of the sampled signal.

After having calculated the terms ps and pc and carried out their ratio, during stage l, a test is conducted on the value obtained for this ratio so as to check if ps/pc is less than a predetermined threshold, (ps/pc)max being selected according to the precision it is desired to obtain concerning the flow rate measurement (stage m).

If ps/pc ∈ (ps/pc)max, this means that the calculation of the inverse tangent of the ratio ps/pc, $\phi err(12)$, which is equal to ($\phi 1(1) - \phi ref$) where $\phi 1(1)$ represents the ultrasonic phase of the sampled signal, cannot be approximated to ps/pc (Arctgx=x). It is then necessary to calculate the Inverse tangent (stage n) so as to obtain the value of the phase difference between the phase of the sampled signal and the reference phase: $\phi err(1) = Arctg(ps/pc)$.

On the other hand, if ps/pc<(ps/pc)max, the approximation Arctg x=x can be made and the value of the phase difference between the phase of the sampled signal and the reference phase is then given by the expression $\phi err(1) = ps/pc$ (stage o).

In this case, this means that the phase difference between the phase of the sampled signal and the reference phase approximates zero with the desired precision defined by the threshold (ps/pc)max.

It ought to be mentioned that, when the stages of FIG. 2 correspond to the first iteration, it is probable that the determination of $\phi err$ causes one to calculate the Inverse tangent of the ratio ps/pc.

During the first iteration, the stage p is summed up to be written $\phi 1(1) + \phi ref = \phi err(1)$.

The next stage q defines a programmable phase shift expressed in the form of a delay $\tau p(1)$ which is tied to the value of the ultrasonic phase shift obtained previously by means of synchronous detection $\tau p(1 = \phi err(1)/2\pi Fac$.

In accordance with stage r, the programmable delay $\tau p(1)$ is then introduced between the transmission stage and the synchronous detection stage so as to allocate from this delay the next ultrasonic signal to be transmitted in the same direction of propagation. For the order n iteration, an ultrasonic signal is transmitted in the same propagation direction as the signal transmitted at the time of the iteration of order n−1 (stage i) and then the ultrasonic signal is sampled and digitalized (stage k) before undergoing a synchronous detection (stages l to o).

During stage l, the following operations are carried out (synchronous detection):

$$ps = \Sigma a[ti + \tau p(n-1)] \times \sin(wtj - \phi ref)$$

where $\tau p(n-1)$ represents the programmable delay calculated on the preceding iteration of order n−1 and which has been applied to the signal processed in the current order n iteration between the stage for transmitting this signal and the synchronous detection stage.

In accordance with stages l and m and as explained earlier, the ratio ps/pc is calculated and a comparison test is made of the value of this ratio with the threshold (ps/pc)max.

Depending on the case (stage o or n), a calculation is made by approximation (Arctgx=x) or by the Inverse tangent calculation of $\phi err(n)$ which is equal to the phase difference between the phase of the sampled signal during the order n iteration and the phase of the reference signal.

The value of the ultrasonic phase shift obtained by synchronous detection during the iteration of order n, $\phi 1(n) - \phi ref$ is determined during stage p by firstly the sum of the phase difference $\phi err(n)$ between the phase of the sampled signal during the order n iteration and the phase of the reference signal, and secondly of the programmable phase shift of the iteration of order n−1, $2\pi Fac\tau p(n-1)$, namely:

$$\phi 1(n) + \phi ref = \phi err(n) - 2\pi Fac\tau p(n-1)$$

According to the value of the ultrasonic phase shift obtained, a new programmable delay $\tau p(n)$ is obtained and tied to this value:

$$\tau p(n) = (-\phi 1(n) - \phi ref/2\pi Fac \text{(stage q)}$$

and this delay is applied to the next ultrasonic signal between the transmission stage and the synchronous detection stage (stage r) so that the stage for synchronously detecting the iteration of order n+1 determines a phase difference $\phi err(n+1=)$ between the phase of the sampled signal during the iteration of order n+1 and the reference phase which is as close as possible to zero.

When $\phi err(n+1)$ is as close as possible to zero, it is possible to carry out the approximation Arctgx=x and one has $\phi err(n+1) = ps/pc$.

This means that the ultrasonic phase shift value $\phi 1(n+1) + \phi ref$ is approximately equal to the programmable phase shift $2\pi Fac\tau p(n)$ applied during the iteration of order n to the nearest term ps/pc.

Figure 2A:
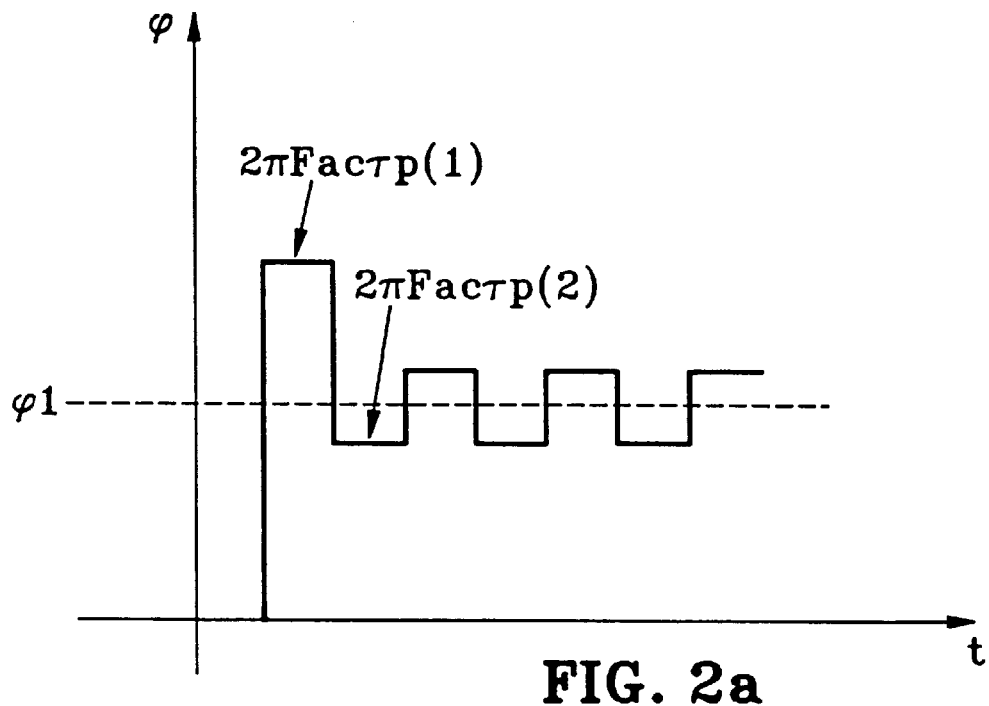
FIG. 2a shows the result of the various successive measurements of the acoustic phase shift made according to the stages of the method of FIG. 2, FIG. 2b indicates the digital values obtained in the example shown on FIG. 2a, FIG. 3 is a simplified diagrammatic view of an electronic circuit used to implement the method according to an embodiment of the invention.

The process of successive iterations used for measuring the ultrasonic phase shifts is shown on FIG. 2a which translates the time-dependent phase shift and thus shows that in two successive iterations, it is possible to satisfy the condition expressed in stage m of FIG. 2, that of is replacing the stage n by the stage o, thus suppressing the calculation of the Inverse tangent of the ratio ps/pc.

Figure 2B:
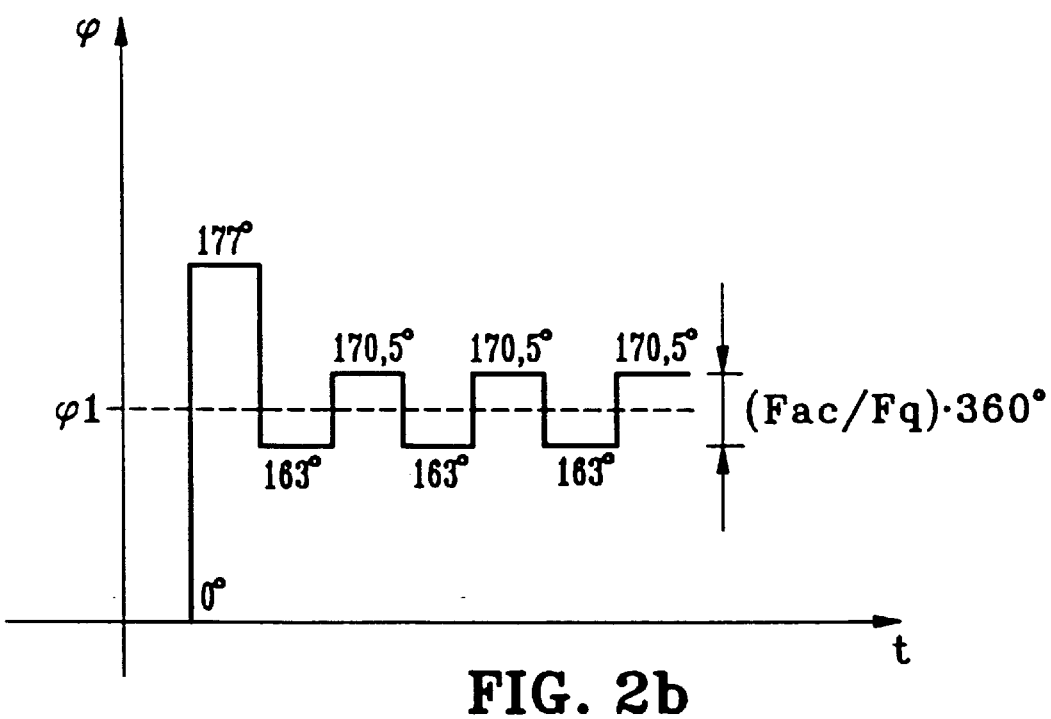

FIG. 2b furnishes the ultrasonic phase shift digital values of the example represented on FIG. 2a and (Fac/Fq)360° represents the resolution due to sampling.

In this example, the resolution is 3.75° given the fact that Fac=40 kHz and

Fq=3.84 Mhz.

This method is thus advantageous in that it makes it possible to reduce the calculation time and volume and consequently limit energy consumption.

This is particularly advantageous when the measurement of the fluid flow rate is implemented on a counter equipped with batteries, given the fact that the lifetime of these batteries is increased.

Figure 3:
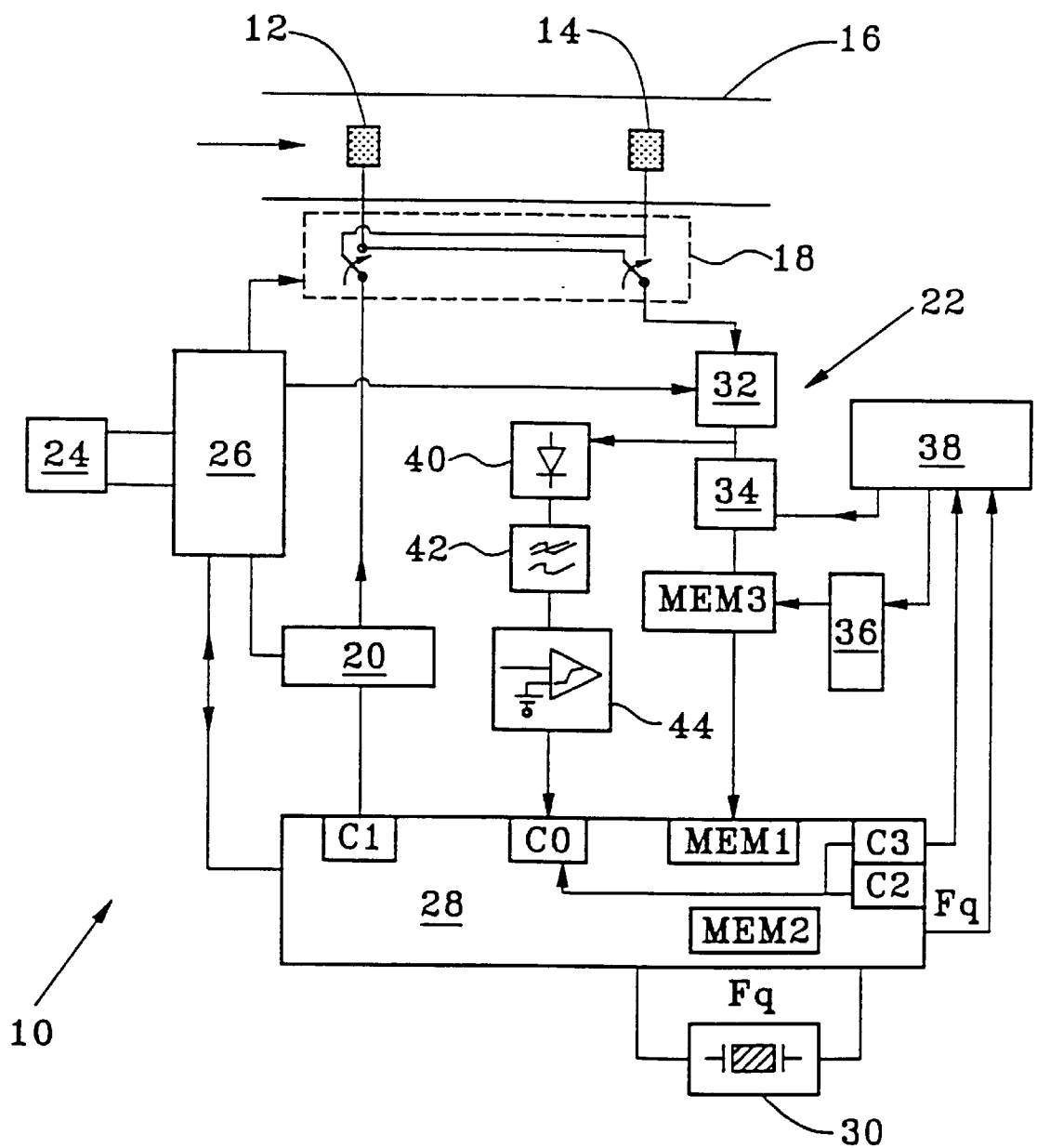
FIG. 3a illustrates the method for determining the propagation time of an acoustic signal via moving to zero.
FIG. 3b is an enlarged diagrammatic view of the electronic circuit of FIG. 3 used to determine the propagation time of an acoustic signal by the method of the envelope with the speed of the signals corresponding to each stage.

An example of an electronic circuit 10 used to implement the method of the invention is diagrammatically shown on FIG. 3. This figure shows the electronic circuit 10 used to firstly electrically feed the various operational blocks to be described hereafter, and secondly for controlling the method for measuring the gas flow rate of the invention.

As shown on this figure, two ultrasonic transducers 12, 14 operating at a frequency of 40 kHz are disposed face to face in a pipe 16 in which a gas flows.

These two transducers are connected to a switching block 18 which enables each transducer to be used alternately as a transmitter and receiver.

Two blocks are connected to this switching block 18, one being a transmission block 20 and the other a receiving block 22. The transmission block 20 includes an operational amplifier and a digital/analog converter.

The circuit 10 includes an electric energy source 24 and a block 26 for managing the electric power connected to the switching and receiving blocks and to a microcontroller 28 which includes a quartz clock 30 whose frequency Fq is 3.94 Mhz, an arithmetic and logical unit, a sequencer, a RAM (Random Access Memory) type MEM1 live memory, an ROM (Random Access Memory) type MEM2 dead memory and several counters C1 to C3.

The various instructions corresponding to the stages of the method of the invention shown on FIGS. 1 and 2 are contained in an MEM2 memory. The receiving block 22 includes an amplifier 32 connected to the switching block 18 and amplifying the electric signal corresponding to the received ultrasonic signal, a digital/analog converter 34 which simultaneously digitalizes and samples said signal, a RAM type MEM3 live memory which stores the sampled values, a preloaded 8-bit counter which manages the writing addresses in the MEM3 memory with a constant frequency determined by a clock frequency divider contained in a synchronization block 38 connected to the microcontroller 28. This block 38 is able to synchronize the stage for sampling the received signal.

The receiving block 22 connected to the output of the amplifier also includes a double alternation rectifier circuit 40 constituted by a diodes point, a low-pass filter 42 connected to the rectifier circuit, a threshold comparator 44 connected to said filter and to a 16-bit register Co of the microcontroller.

A register C2 forming part of the microcontroller is preloaded so as to start acquisition of the sampling points. A 16-bit counter C3 controls the synchronization block 38.

This counter C3 counts the time elapsed since the start of transmission of an ultrasonic signal by one of the transducers 12, 14. The contents of the register C2 are compared to the value obtained by the counter C3 at the time of each ascending front of the clock signal.

When the contents of the counter C3 reach the value contained in the register C2, the synchronization block 32 generates a signal at the sampling frequency Fe intended for the converter 34.

As explained previously with reference to FIG. 2, a programmable phase shift is allocated to each ultrasonic signal transmitted between the two ultrasonic transducers. This phase shift expressed in the form of a delay may be applied to the signal between the signal transmission stage and the synchronous detection stage, which renders this method extremely flexible in use.

Figure 4:
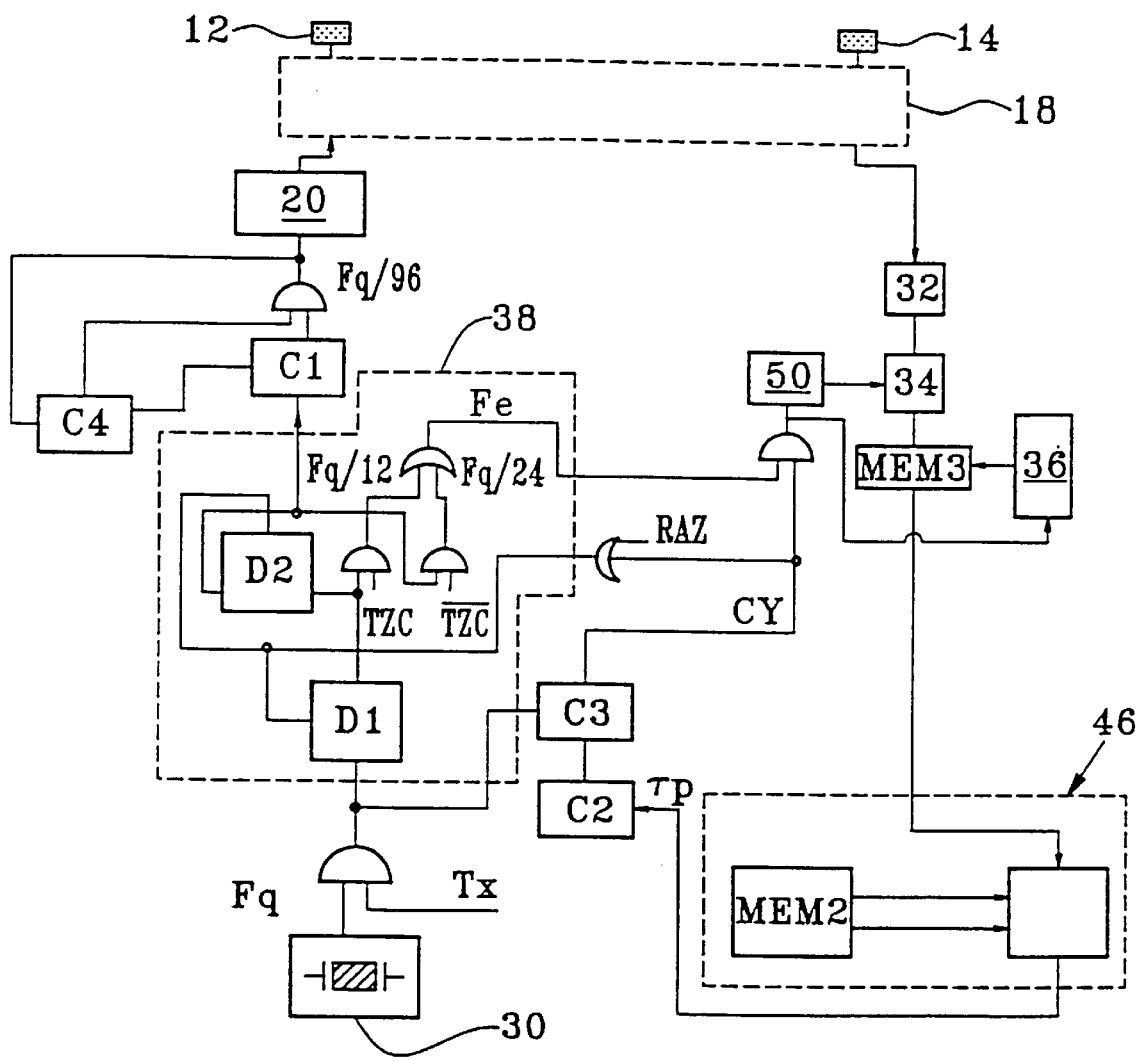
FIG. 4 is a detailed partial diagrammatic view of the electronic circuit of FIG. 3 according to an embodiment of the invention in which a programmable phase shift is introduced during the stage for sampling the received acoustic signal.

Thus, it is possible to introduce a programmable delay into the received signal at the time it is sampled. FIG. 4 illustrates this possibility.

The programmable delay can also be applied in the reference sine and cosine signals used during synchronous detection. This variant is not described on the figures.

It is also possible to break down the programmable delay into two sub-delays which are each introduced into the signal during a separate stage of the method between the signal transmission stage and the synchronous detection stage.

So as to determine the programmable sub-delay to be applied during a specific stage of the method, an Euclidean division is made of the programmable delay with respect to the modulus of the resolution of the programmable phase shifter used in said stage of the method.

Figure 5:
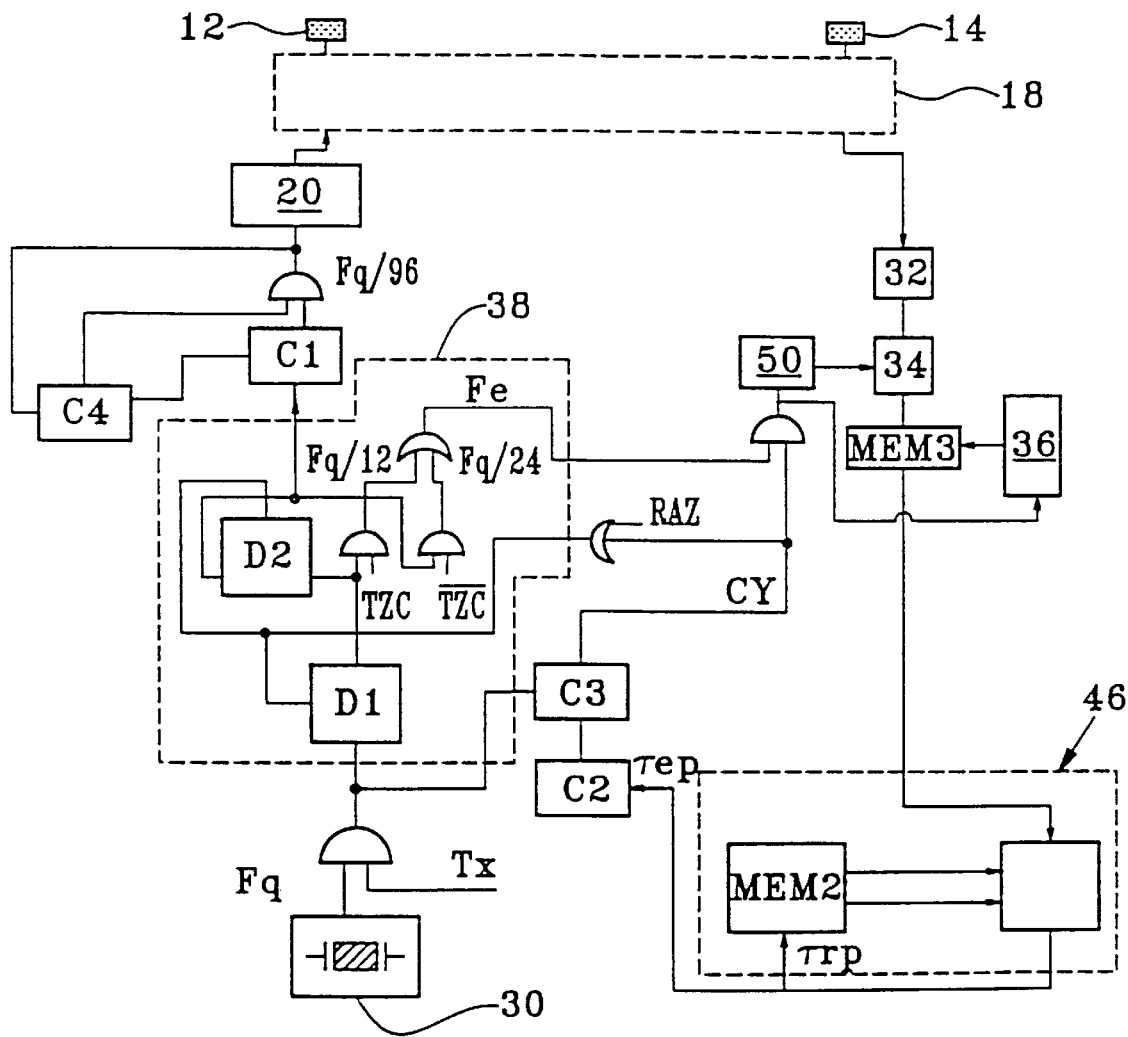
FIG. 5 is a detailed partial diagrammatic view of the electronic circuit of FIG. 3 according to a first embodiment variant of the invention in which a programmable phase shift is partly introduced during the sampling stage and partly into the reference signals used for the synchronous detection stage.

Thus, as shown on FIG. 5, the programmable delay is broken down into two sub-delays with one being introduced during the sampling stage into the sampling signal and the other during the synchronous detection stage into the reference sine and cosine.

Figure 6:
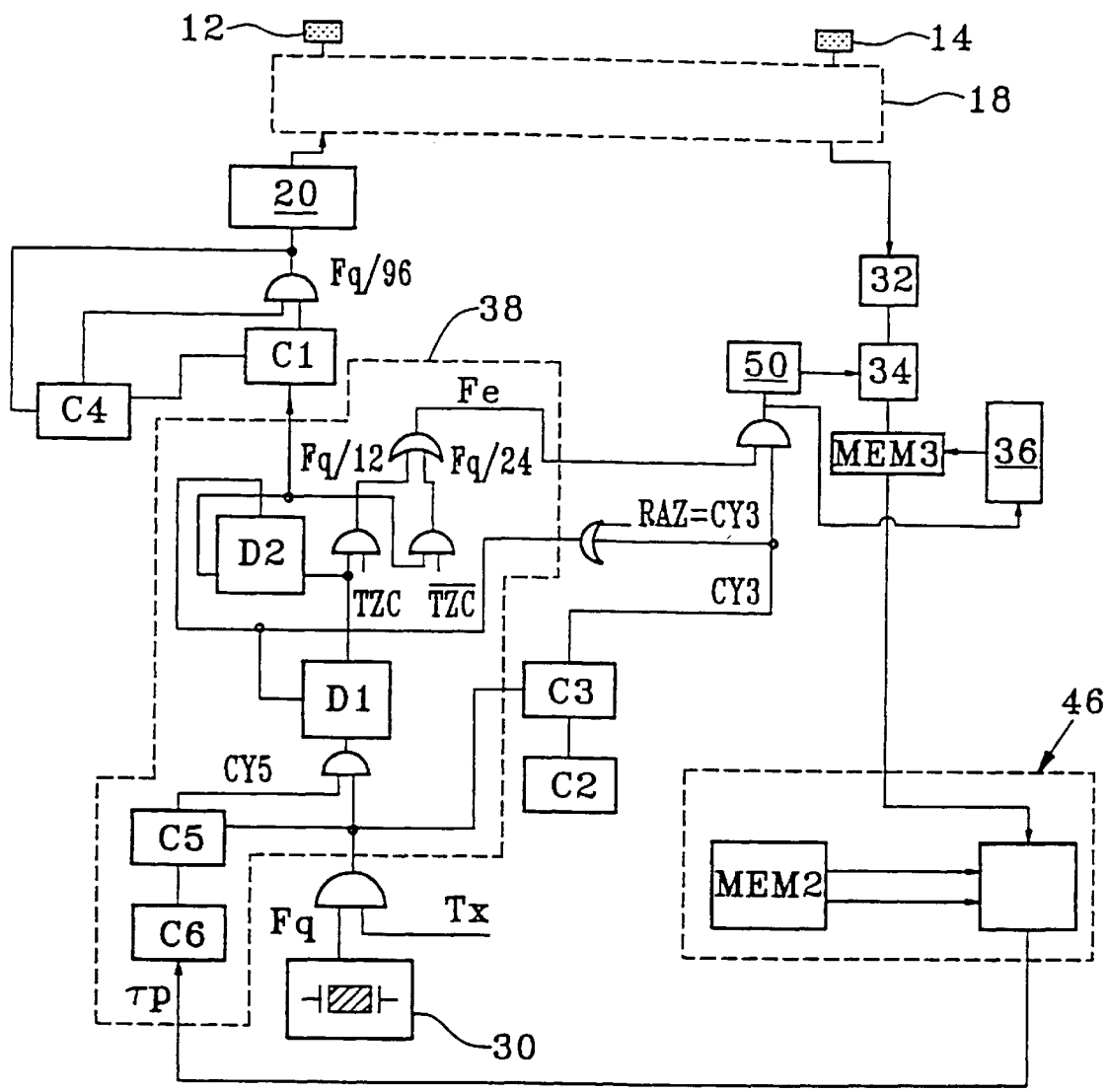
FIG. 6 is a detailed partial diagrammatic view of the electronic circuit of FIG. 3 according to a second embodiment variant of the invention in which a programmable phase shift is introduced during the stage for transmitting the acoustic signal.

As shown on FIG. 6, the programmable delay can also be introduced during the transmission stage into the transmission signal.

Figure 7:
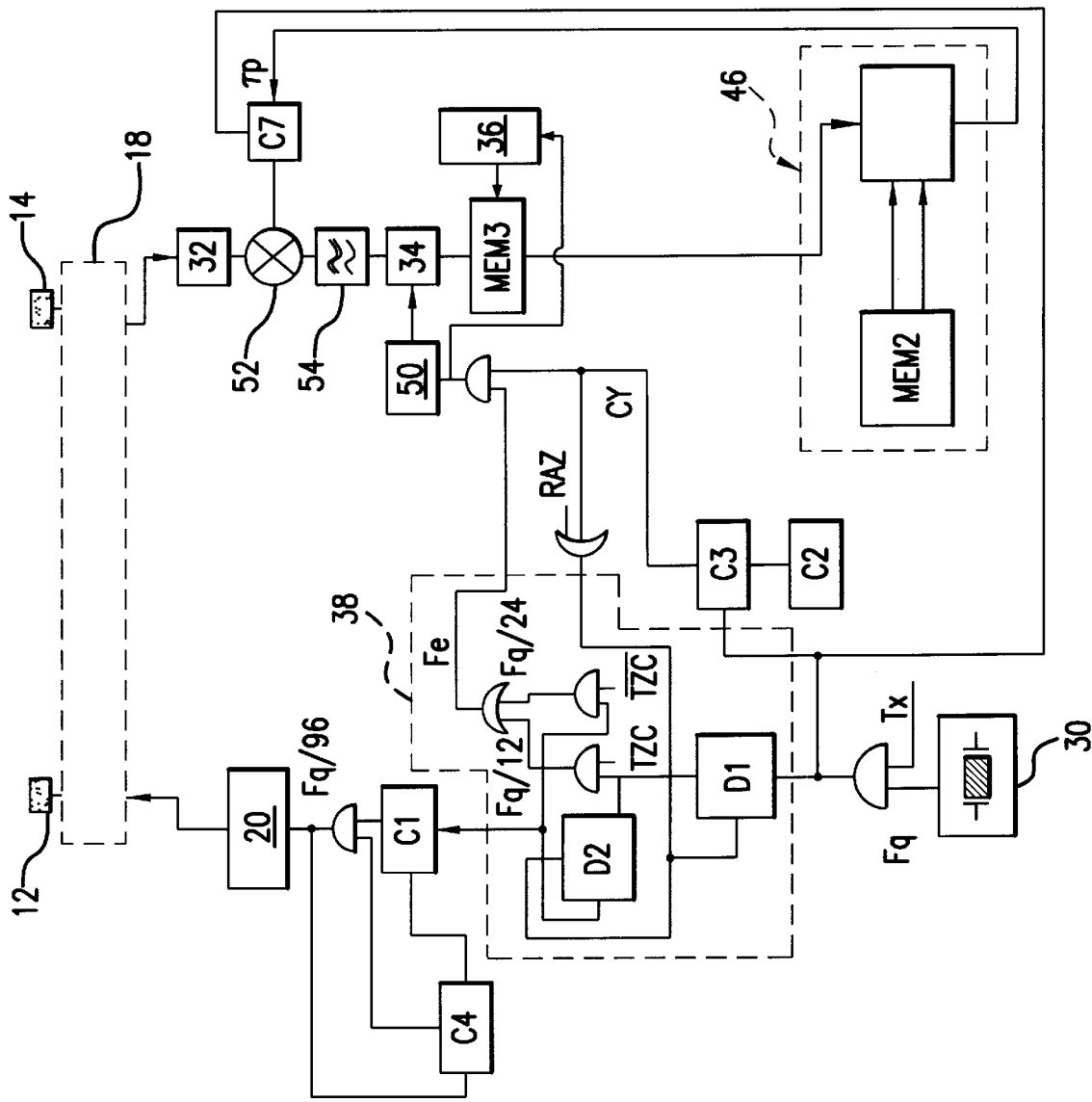
FIG. 7 is a detailed partial diagrammatic view of the electronic circuit of FIG. 3 according to a third embodiment variant of the invention in which a programmable phase shift is introduced during the stage for heterodyning the received acoustic signal.

FIG. 7 also illustrates another possibility for carrying out a heterodyning operation on the received signal. Thus, the signal receiver is mixed with a mixing signal to which the programmable delay is allocated so as to obtain a mixed signal whose frequency is reduced with respect to the frequency of the signal received.

By breaking the programmable delay into two and indeed more than two programmable sub-delays, it is possible to make a large number of combinations between the various stages into which the programmable sub-delays are introduced: sampling, synchronous detection, transmission, heterodyning.

There now follows a description of an embodiment of the method of the invention for measuring the gas flow rate with reference to FIGS. 1, 2, 3, 3*a*, 3*b*, 4 and 4*a*.

As shown on FIG. 1, following transmission of two ultrasonic signals in opposing directions, in stage a a measurement is made of the respective propagation times (T1pz–T0) and (T2pz–T0) of each of these signals by the passage to zero method.

The instructions for carrying out these measurements are contained in the MEM2 dead memory of the microcontroller 28.

Figure 3A:
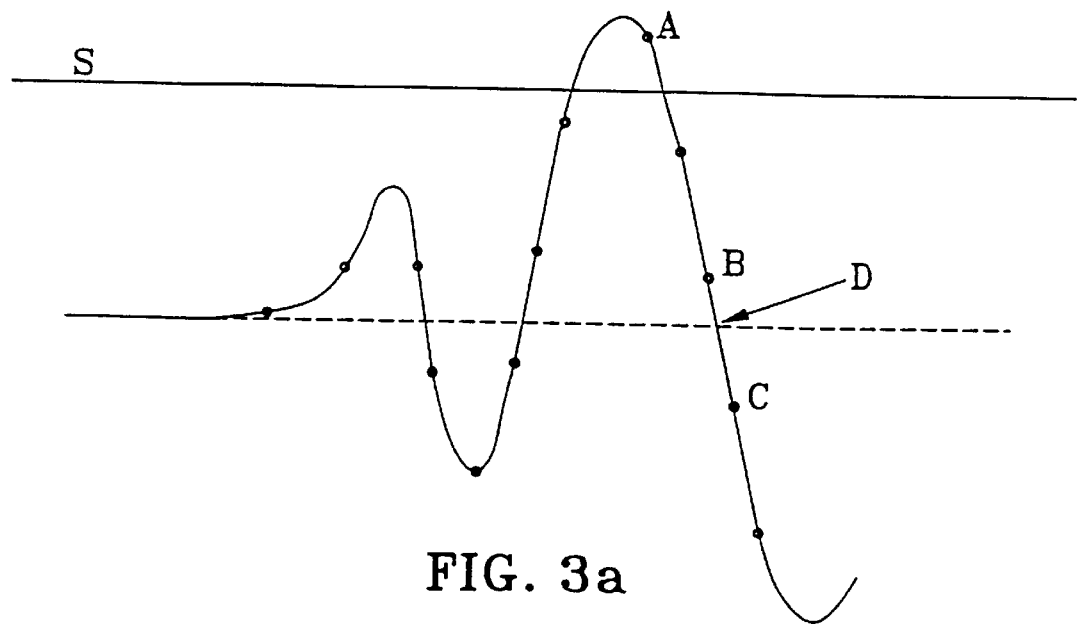

FIG. 3*a* illustrates the passage to zero measuring method carried out on each received ultrasonic signal. The received signal is amplified by the amplifier 32 of FIG. 3 and then simultaneously digitally converted and sampled in the converter 34. Sampling is carried out at a frequency Fe equal to 8 Fac, namely 320 kHz.

The instructions contained in the MEM2 memory make it possible to compare the values of the amplitude of the signal received at the sampled points and which are stored in the MEM3 live memory at a predetermined value corresponding to a threshold S and from the amplitude values of the sampled points, the next first point A is looked for having an amplitude value greater than the threshold.

From this point, the next passage through zero of the curve representative of the ultrasonic signal is looked for. In order to do this, two consecutive sampled points B and C are determined which frame the point where the amplitude of the curve passes through the zero value and straight-line interpolation is carried out between B and C so as to determine the point D and thus measure the passage to zero time (Tpz–T0).

It is also possible to look for the final passage to zero of the curve representative of the ultrasonic signal before said curve passes through the threshold. (T1pz–T0) and (T2pz–T0) are measured according to this method (stage a) and stored in the MEM1 memory of the microcontroller and then stages b and c of FIG. 1 are carried out as explained previously.

During stage b, the calculations are carried out by the arithmetic and logical unit of the microcontroller 28 and the values KT of the incremented gas volume and the parameter nφ are stored in the MEM1 memory.

Figure 3B:
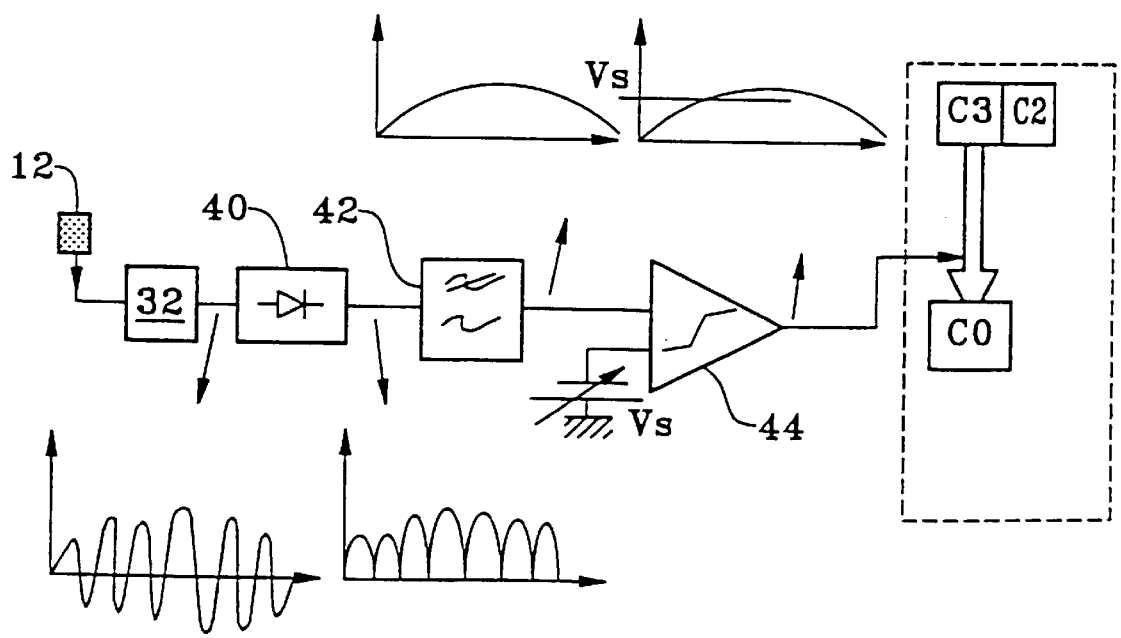

During stage d, two consecutive shots in opposing directions are carried out on each ultrasonic signal transmitted in one direction and the propagation time of said signal is measured by the envelope method Tenv, as well as the corresponding ultrasonic phase shift φ. FIG. 3*b* illustrates the envelope measuring method.

As shown on FIG. 3*b*, when an ultrasonic signal is received by one of the transducers, such as the transducer 12, said signal is converted into an electric signal and is amplified in the amplifier 32, rectified in the rectifier circuit 40 and filtered in the low-pass filter 42 so as to form the envelope of the received signal.

A diagram giving the speed of the signal after the operation concerned corresponds to each operation carried out on the electric receiving signal.

The threshold comparator 44 is used to compare the passage of the curve representing the envelope of the received signal by a predetermined threshold corresponding to an adjustable threshold voltage Vs.

The outgoing signal of the comparator 44 is connected to the "Load" input of the 16 bit register CO. The register Co captures the contents of the counter C3 when the outlet of the comparator 44 changes state. Thus, the register Co contains the moment when the envelope of the ultrasonic echo traverses the voltage threshold Vs. This value then makes it possible to determine the propagation time T1env or T2env featured in the formula expressing the gas flow rate as the counter is initialized to zero at the start of an ultrasonic transmission.

Figure 4A:
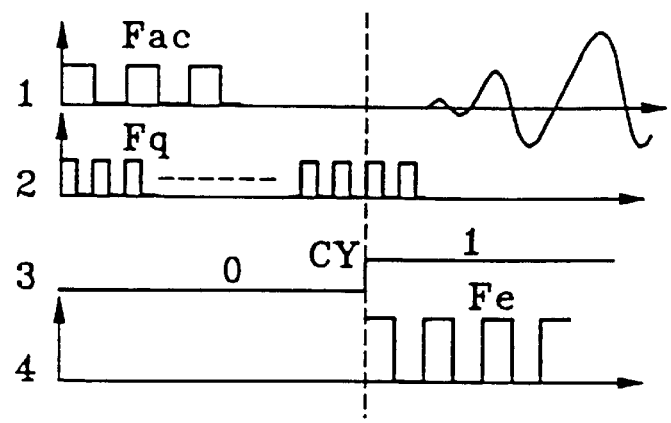
FIG. 4a represents the simultaneous time-evolution of the various signals used for sampling the signal when the programmable phase shift is introduced during the stage for sampling the received acoustic signal.

The ultrasonic phase shift induced via the propagation of this ultrasonic signal is determined in accordance with the stages of FIG. 2, with reference to FIGS. 4 and 4a and is placed as part of the order n iteration of the method of the invention.

Thus, as shown on FIG. 4a, a transmission signal is generated from a microcontroller by dividing the frequency Fq of the clock so as to obtain a frequency signal Fac=40 kHz exciting one of the transducers. The other transducer receives the signal which has the aspect retained on the right portion of the diagram 1 of FIG. 4a.

With reference to FIG. 4, when the signal Tx originating form the arithmetic and logical unit of the microcontroller 28 moves to 12, the clock signal with frequency Fq is freed by the "AND" logic gate and firstly feeds the counter C3 and secondly the counter C1 by means of the synchronization block 38 delimited by the dotted lines.

The clock signal which feeds C1 is first of all sent to a frequency divider by 12 counter D1 which in fact is formed of four FF type (Flip-Flop) circuits successively dividing the frequency Fq of the clock by 3, 2 and 2.

The outlet of the counter D1 feeds the "needle" formed of several "AND" and "OR" logic gates, as well as a frequency by 2 divider counter D2 formed of an FF circuit.

The outlet signal originating from D2 is then sent to the frequency by 4 divider counter C1, thus making it possible to obtain a frequency Fq/96 at the outlet of said counter C1 and which feeds one of the inlets of an "AND" gate.

A 4 bit counter C4 outside the microcontroller 28 is connected to the other inlet of this logic gate and to the counter C1. This counter C4 is preloaded to a fixed value which corresponds to the desired number of periods of the excitation signal, such as 8, and the "AND" logic gate allows the excitation signal with a frequency Fq/96 (=40 kHz) to pass as long as the counter C4 has not finished counting down.

When the counter C4 returns to zero, the excitation signal is then locked.

When the signal Tx is at 1, the counter C3 is fed.

The register C2 is preloaded to a predetermined value corresponding to an estimate of the propagation time of an ultrasonic signal between the two transducers. The counter C3 counts at the frequency of the clock Fq as soon as it is fed and until reaching the predetermined value of the register (diagram 2 of FIG. 4a). A decoder (not shown) continuously compares the value reached by the counter C3 with the value contained in the register C2.

This value of the register C2 is in fact a programmable delay $\tau p(n-1)$ which is determined at the time of the preceding iteration of order n−1 of the method and which is applied to the sampling signal (FIG. 4).

At the same time on counting by the counter C3, one of the transducers is excited by an excitation signal with a frequency Fq/96 and generates an ultrasonic signal which propagates in the gas and reaches the other transducer on being affected by an ultrasonic phase shift $\phi$.

At this moment, the counter C3 has reached the programmed value $\tau p(n-1)$ of the register C2 and the signal CY moves to 1, the divider blocks D1, D2 are reset to zero and the sampling signal with the frequency Fe is freed.

This signal has a frequency equal to Fq/24 when the signal Tzc originating form the microcontroller 28 is at 0.

On the other hand, when the propagation times are measured by the passage to zero method, the signal Tzc is at 1 and the signal at the outlet of the "OR" gate has a frequency equal to Fq/12.

The signal with the frequency Fe derived from the synchronization block 38 is sent to an input of an "AND" logic gate, the other inlet of this gate receiving the signal CY originating from the counter C3. When the signal CY moves to 1, the signal of frequency Fe feeds the counter 36 and a logic inverter which feeds the converter 34.

On the ascending front of the sampling signal, the conversion is made of the electric signal corresponding to the ultrasonic signal received once it has been processed by the block 32 and the values of the sampled and converted signal are written in the MEM3 memory at the address contained in the counter 36.

On the descending front of the sampling signal, the writing address contained in the counter 36 is incremented by 1.

When the addresses of the counter 36 are all filled, the sampling stage stops on account of the freeing of a signal which makes the signal Tx move to 0.

It is proper to mention that the determination of the propagation time Tenv is carried out at the same time as the conversion and sampling of the signal received.

The sampling frequency is selected as being equal to 4Fac so as to reduce the energy consumption.

The values of the sine and cosine reference signals stored in an MEM2 dead memory are equal to −1, 0, +1, 0, −1, 0, +1 owing to the choice of the sampling frequency Fe.

Thus, at the time of the calculations made in stage 1, the calculation of ps and pc is in fact reduced to simple additions, thus reducing the calculation volume and accordingly the energy consumption.

In the synchronous detection block 46 symbolically represented on FIG. 4, the stage m of FIG. 2 is carried out so as to know the value of the ps/pc ratio and compare it to (ps/pc)max.

Next, a calculation is made of $\phi err(n)$ which represents the phase difference between the phase of the sampled signal at the time of the order n iteration and the phase of the reference signal (stages n or o of FIG. 2). On the basis of this value, the arithmetic and logical unit of the microcontroller calculates the programmable delay $\tau p(n)$ to be written in the register C2 (stages p q, r) so as to preload it to the value $\tau p(n)$ (counting down period).

This delay is not exactly equal to the ratio $(-\phi(n)-\phi ref)/2\pi Fac$ as it takes account of the resolution of the programmable delay.

During the next ultrasonic transmission (iteration of order n+1) carried out in the same propagation direction as the one corresponding to the iteration of order n described earlier, the programmable delay $\tau p(n)$ which has been determined shall be written in the register C2 so that the synchronous detection stage carried out during the iteration of order n+1 determines a phase difference $\phi err(n+1)$ between the phase of the signal sampled at the time of this iteration and the reference phase which is lower than the threshold (ps/pc) max.

When this condition is satisfied, φerr(n+1)=ps/pc and it is not necessary to calculate the Inverse tangent of the ps/pc ratio. The ultrasonic phase shift is then equal to the programmable phase shift of the order n iteration, $2\pi Fac\tau p(n)$ to the nearest term φerr(n+1) (this term is extremely small given the approximation Arctgx=x).

FIG. 5 represents a first embodiment variant of the invention. During this variant, the course of the various stages remains unchanged with regard to what has been described earlier with reference to FIGS. 2, 4 and 4a, except for the synchronous detection stage and the one for determining the programmable delay to be applied.

In fact, if one is in the order n iteration, when the phase difference φerr(n) enters the phase of the signal sampled at the time of this iteration and the reference phase recently determined, either by calculation of the Inverse tangent (stage n) or by approximation (stage o), the programmable delay τp(n) obtained by calculation (stages p and q) is then broken down into two programmable sub-delays τep(n) and τrp(n).

These two sub-delays are respectively applied to the register C2 for sampling and to the table of stored values +1, 0, −1, 0, +1 . . . in the MEM2 dead memory corresponding to the reference sine and cosine.

Each of these sub-delays is determined by firstly carrying out the Euclidean division of the modulo programmable delay τp(n) the sampling frequency ???, and secondly the resolution of the programmable delay.

Thus, the programmable sub-delay τep(n) allocated to the register C2 is equal to m(Fac/Fq) 360°/2πFac where (Fac/Fq) 360° represents the resolution of the programmable delay.

Similarly, the programmable sub-delay τrp(n) allocated to the values of the reference sine and cosine is equal to k(Fac/Fe) 360° where (Fac/Fe) 360° represents the resolution due to sampling.

For example, if the value of the ultrasonic phase shift obtained in stage p (FIG. 2) of the method is 194°, it is possible to break it down as follows:

$$194°=m(Fac/Fq)360°+k(Fac/Fe)360°$$

By taking Fe=4Fac and Fac=Fq/96, the following is obtained:

$$194°=m\times3.75°k\times90°$$

namely in fact 194°=3×3.75°+2×90°+2.75° where the last term 2.75° is a residuum constituting a phase hooking error.

It is also possible to apply to the register C2 a constant estimate of the acoustic propagation time to which the delay is added τep(n)=3×3.75°/2πFac, namely τep(n)=3/Fq, which corresponds to three clock fronts at the frequency Fq and to the values of the reference sine and cosine, the delay τrp(n)=2×90°/2πFac, namely τrp(n)=2/Fq corresponding to two sampling clock fronts.

Figure 6A:
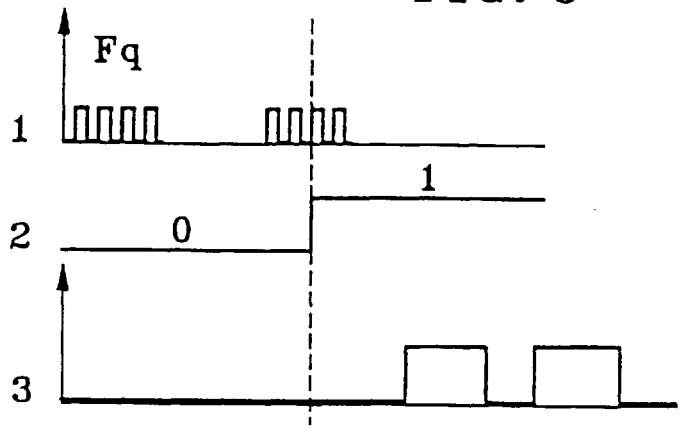
FIG. 6a represents the simultaneous time-evolution of the various signals used for sampling when the programmable phase shift is introduced during the stage for transmitting the acoustic signal.

FIGS. 6 and 6a represent a second embodiment variant of the invention. In relation with these figures, only the stages of the method making it possible to determine the ultrasonic phase shift shall be described.

As shown on FIGS. 6 and 6a for the iteration of order n of the method, a transmission signal intended to excite a transducer so as to generate an ultrasonic transmission signal is formed from the microcontroller 28 by a divider counter of frequency C1 which divides the frequency Fq of the clock 30 by 96 so as to obtain a transmission signal with the frequency Fac=40 kHz.

This transmission signal is generated from a clock signal with the frequency Fq which is sent onto an input of a first "AND" logic gate, the other input receiving the signal Tx originating from the arithmetic and logical unit of the microcontroller 28.

The output of this logic gate is connected to an input of a second "AND" logic gate whose output is connected to the divider block with the frequency D1, already described with reference to FIG. 4.

The output of the first logic gate is also connected to firstly a counter C5 associated with a register C6, and secondly the counter C3 associated with the register C2.

When the signal Tx moves to 1, the counter C5 is fed.

The register C6 is preloaded to a predetermined value corresponding to the programmable delay τp(n−1) determined at the time of the preceding iteration of order n−1.

As soon as the counter C5 is fed, it counts the number of clock fronts (diagram 1 of FIG. 6a) until it reaches the number Fqτp(n−1), equal for example to 10.

This number of clock fronts corresponds to a phase shift equal to 10×(Fac/Fq)×2π, namely 37.5°.

A decoder continuously compares the value reached by the counter C5 and the one contained in the register C6. When this number is reached, the signal CY5 moves to 1 (diagram 2 of FIG. 6a) and the clock signal, frequency Fq, is freed.

In an identical way to the way described with reference to FIG. 4, a transmission signal, frequency Fac=Fq/96, namely Fac=40 kHz, is generated and excites one of the transducers. After excitation of one of the transducers, an ultrasonic signal is successively transmitted from this transducer to the other received by the latter and converted into an electric signal which is amplified before being simultaneously sampled and digitalized in the digital/analog converter 34.

Simultaneously on movement of the signal Tx to 1, the counter C3 counts until reaching the fixed value contained in the register C2. This fixed value is determined according to the estimate of the propagation time of the ultrasonic signal.

When the value contained in the register C2 is reached, the signal CY3 moves to 1, resets to zero the divider blocks D1 and D2 so as to be freed of the phase uncertainty linked to the programmable delay introduced into the transmission stage and frees the sampling signal, frequency Fe, as already described with reference to FIG. 4.

The counter 36 outside the microcontroller 28 generates writing addresses in the MEM3 live memory so as to store there the values of the sampled signal.

All the following stagers linked to synchronous detection have already been described with reference to FIGS. 2 and 4 and remain unchanged, apart from the programmable delay which is written in the register C6 used for the transmission stage instead of the sampling stage.

The third variant illustrated on FIG. 7 is advantageous if it is desired to reduce the calculation volume and thus the energy consumption of the method. According to this variant, a transmission signal excites one of the transducers which generates an ultrasonic signal in the direction of the other transducer. The signal allocated to an ultrasonic phase shift sought to be determined is received by the other transducer, converted into an electric signal and amplified.

At the time of the iteration of order n, a divider counter, frequency C7, outside the microcontroller is preloaded according to the programmable delay τp(n−1) which has been determined at the time of the preceding iteration.

When the down-counting period expires, this counter frees a mixing square signal at a frequency Fq/98 close to the frequency Fac (ex: 39 kHz) obtained by division of the frequency Fq of the clock.

The mixing signal and the amplified electric signal derived from the ultrasonic signal are introduced into a transistor bridge type mixer 52.

After heterodyning, the mixed signal obtained has a frequency reduced by 1 kHz and moves into a low-pass filter 54 so as to eliminate the double frequency at (40+39) kHz, namely 79 kHz.

Similarly to what has been described with reference to FIG. 6, at the end of a predetermined fixed time chosen according to the estimate of the propagation time of the ultrasonic signal, the sampling signal is freed and sampling of the heterodyned filtered signal takes place at the frequency Fe, for example at 4 kHz.

The synchronous detection stages are then carried out on the stored values of the sampled signal in accordance with the stages of FIG. 2.

The programmable delay τp(n) is then determined according to the phase difference φerr(n) between the phase of the signal sampled at the time of the iteration of order n and the reference phase and shall be applied to the divider counter, frequency C7, on the next iteration of order n+1 for an ultrasonic signal transmission in the same direction of propagation.

So as to reduce the energy consumption brought about by the method of the invention with any particular sampling frequency, the sampling frequency Fe is fixed at a value equal to 4 Fac.

With this frequency, the values of the reference sine and cosine stored in the MEM2 dead memory shall retain the values +1, 0, −1, 0, +1, . . . which makes it possible to suppress the multiplication operations in stage 1 for synchronous detection (FIG. 2).

Figure 8:
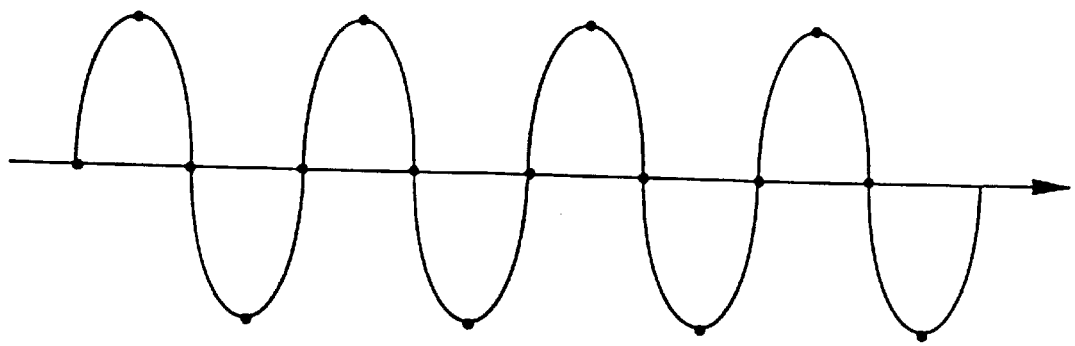
FIG. 8 represents the values of the sampled points of the reference sine and cosine for two different sampling frequencies.
Figure 8:
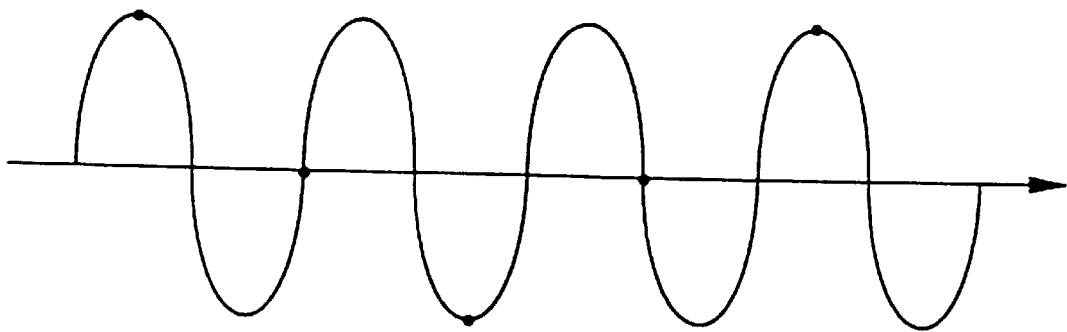

This is illustrated by the top curve on FIG. 8 on which the points represent the values of the reference sine and cosine when sampling is carried out at the frequency 4Fac.

By fixing the sampling frequency Fe to a value equal to 4Fac/2n+1 where n is not nil (sub-sampling), the values +1, 0, −1, 0, +1 are retained and a reduced energy consumption is obtained.

This sampling frequency can be used in the variants represented on FIGS. 4, 5 and 6.

For a frequency Fe equal to 4Fac/3, (n=1), the values of the reference sine and cosine represented by the points of the lower curve of FIG. 8 are obtained.

However, the sampling frequency is limited which means that 2n+1 cannot assume any value.

In fact, in the frequential spectrum of the sampled signal, if the width between two consecutive lines of the sampled signal is smaller than the band width of the signal, an error is then introduced into the spectrum fold back phase measurement.

As a result, the sampling frequency Fe cannot adopt a value fro which the band width of the signal is larger than the width between two consecutive lines of the sampled signal.

Thus, for example, if the ultrasonic signal has a frequency of 100 kHz and a band width of 10 kHz, the difference 2Fac/2n+1 between two consecutive lines needs to be greater than 10 kHz which fixes the limit: 2n+1<20.

The frequency Fe is therefore greater than 20 kHz.

It ought to be mentioned that the use of a sampling frequency Fe equal to 4Fac/2n+1 with n #0 for reducing energy consumption is also applicable to a method for the ultrasonic measurement of a fluid flow rate of the prior art in which the acoustic phase shift is determined by synchronous detection without introducing any programmable phase shift.

Figure 9:
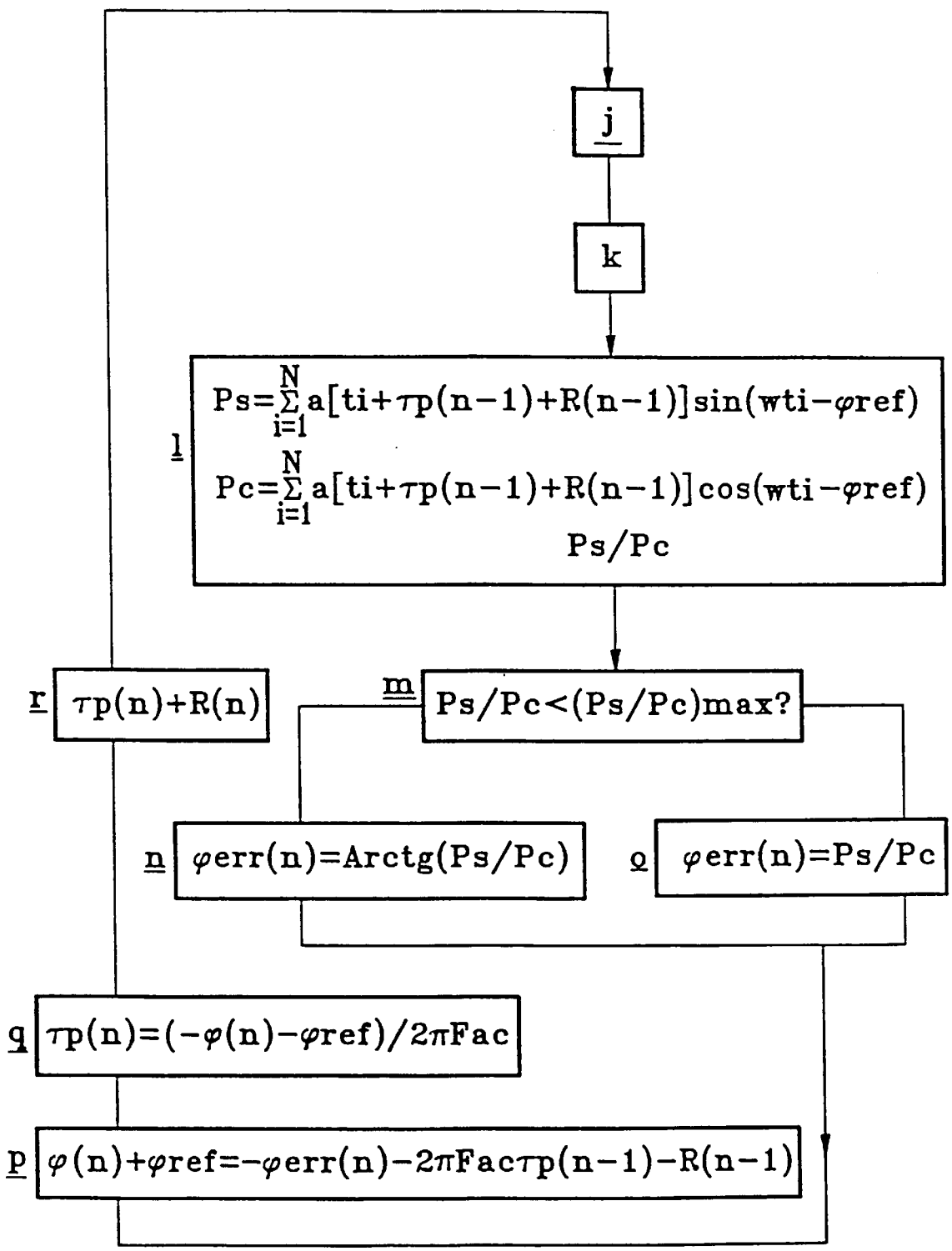
FIG. 9 is a variant of the flowchart of FIG. 2.
Figure 11:
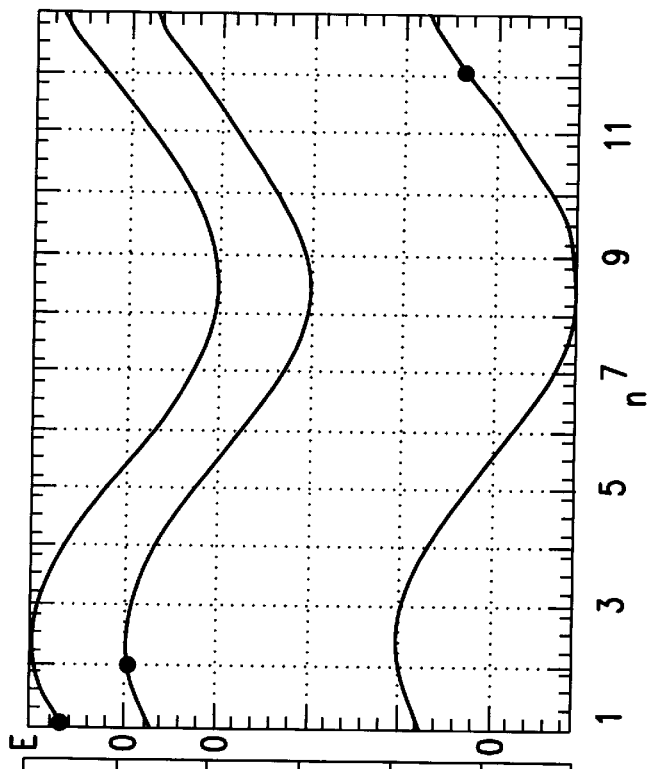
FIG. 11 shows for each of the iterations represented on FIG. 10 a curve representing the phase error E due to the folding back of the harmonic lines after sampling according to the applied programmable delay τp(n)+R(n).
Figure 10:
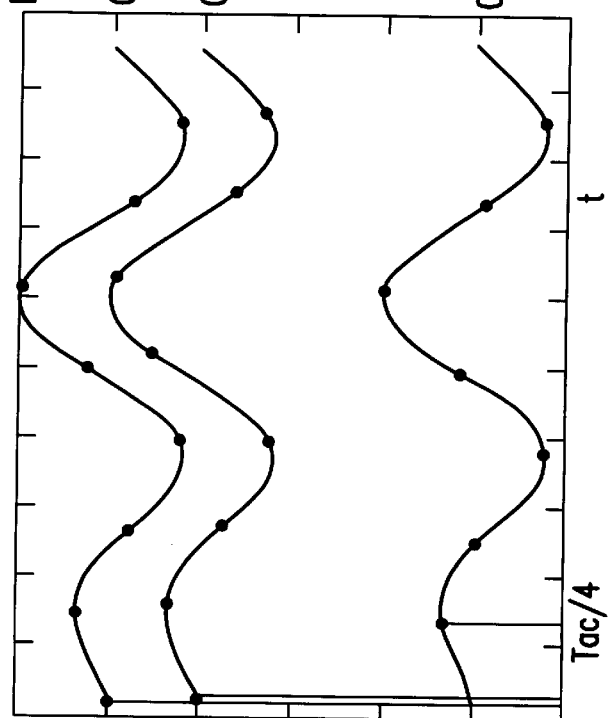
FIG. 10 shows on the curve representing the acoustic signal the various sampling points obtained by applying to each order n iteration an additional delay R(n) to the programmable delay τp(n) shown on FIG. 2 (twelve iterations in all)

Another embodiment variant is shown on FIGS. 9 to 11. This variant is useful when the sampled acoustic signal contains energy derived from parasitic harmonic lines at frequencies Fp such as Fp±KFe=Fac on account of a spectrum fold up???.

This may be the case when the amplifier 32 of FIGS. 3, 4, 5, 6 and 7 is fed with relatively low voltages of about 3V and a harmonic distortion phenomenon is observed which causes parasitic lines to appear.

The following passage in the text shall make it possible to more readily understand the effect of these parasitic lines on the fluid flow rate measurement.

If it is assumed that the acoustic signal received is a sineoid at 40 kHz, that the amplified acoustic signal contains a parasitic line at 120 kHz with an amplitude Ap and that the phases of the two signals are equal and nil, said acoustic signal is written as follows:

$$Y = \cos(2\pi \tau p(n-1)/Tac) + Ap \cos(6\pi \tau p(n-1)/Tac)$$

$$Y2 = -\sin(2\pi \tau p(n-1)/Tac) + Ap \sin(6\pi \tau p(n-1)/Tac)$$

$$Y3 = -\cos(2\pi \tau p(n-1)/Tac) + Ap \cos(6\pi \tau p(n-1)/Tac)$$

$$Y4 = +\sin 2\pi \tau p(n-1)/Tac) + Ap \sin(6\pi \tau p(n-1)/Tac)$$

where τp(n−1) denotes the programmable delay defined with reference to FIG. 2 at the time of the iteration of order n−1.

The synchronous detection stage 1 of FIG. 2 furnishes the values:

$$Ps = -2\sin(2\pi \tau p(n-1)/Tac) + 2Ap \sin(6\pi \tau p(n-1)/Tac)$$

$$Pc = 2\cos(2\pi \tau p(n-1)/Tac) + 2Ap \cos(6\pi \tau p(n-1)/Tac)$$

According to stage n, the phase difference between the phase of the sampled signal and the reference phase is given by: φerr(n)=Arctg (Ps/Pc).

By assuming that the amplitude Ap is slight, φerr(n) can be written: φerr(n)=Arctg [−tg (2π τp(n−1)/Tac) (1=4 Ap cos(4π τp(n−1)/Tac)) ]

By carrying out a limited development of the function Inverse tangent around the value −tg (2π τp(n−1)/Tac), one has:

$$\varphi err(n) = -(2\pi\tau p(n-1)/Tac) - \frac{4Ap\cos(4\pi\tau p(n-1)/Tac)tg(2\pi\tau p(n-1)/Tac)}{1+tg^2(2\pi\tau p(n-1)/Tac)}$$

namely err(n)=−(2π τp(n−1)/Tac)−Ap sin(8π τp(n−1)/Tac).

The error introduced by the presence of the line at 120 kHz is found in a second term of the last expression of φerr(n) which is a sinusoidal period function equal to Tac/4 (FIG. 11).

For an amplitude Ap equal to 0.01, the error can reach a maximum value of 0.57° (=0.01×180/π) which is totally unacceptable when one is looking for a precision of about 0.015° for certain applications.

As the law of error is a nil average periodic function, the Applicant noticed that this error can be overcome by averaging a certain number of acoustic shots carried out as follows: in the flowchart of FIG. 9, the stage r has been modified with respect to that of FIG. 2 so as to add to the programmable delay τp(n) obtained in stage q an additional delay R(n). The various values R(1), R(2) . . . vary between 0 and the sampling period Tac/4 when the sampling frequency Fe is equal to four times the acoustic frequency Fac, which means that the sampling points are made to "slide"

over a quarter of the sineoidal curve corresponding to the acoustic signal. For example, the various values of R(n) vary linearly by steps of Tac/(48) like 0, Tac/(48), 2Tac/(48) . . . (FIG. 10). By applying to each iteration a delay equal to Tac/48 (FIG. 10), a corresponding phase error E is obtained which describes a nil average sineoidal curve, as shown in the disposition of the points obtained on FIG. 11.

At the end of 12 shots, when the sampling period and the phase error curve period 5 have been passed through, the terms due to the presence of the line at 120 kHz is eliminated when the average of the phases is made. The same applies for the parasitic lines on other harmonic frequencies. at the time of the thirteenth shot, the value of R is reset to 0 and the procedure is repeated.

It is proper to note that the various values of R(n) need to be spread over at least one sampling period Tac/4.

However, when the sampling frequency is different from 4Fac, the various values of R(n) need to be spread over at least one sampling period Tac/(Fe/Fac) and are equal to fractions of Tac/(Fe/Fac), the values of R(n) varying linearly by steps of Tac/(Fe/Fac).

This variant is applicable with all the embodiments and variants described earlier.

What is claimed is:

1. Method for measuring a fluid flow rate between two points spaced in the direction of a flow of a fluid whereby the flow rate is obtained by combining a measurement of the respective propagation times of each of two acoustic signals transmitted between the two points in opposing directions with a measurement of acoustic phase shifts respectively induced in each acoustic signal by the propagation of each of said acoustic signals in the flow, the measurement of the acoustic phase shift induced in each acoustic signal consisting of sampling said acoustic signal received at a sampling frequency, of digitalizing the sampled signal and of determining by synchronous detection the acoustic phase shift as being the phase difference between the phase of the sampled signal and the phase of a reference signal, characterized in that the method starts by successive iterations on various acoustic signals successively transmitted in the same direction of propagation by introducing during an iteration of order n+1 in one of said acoustic signals between the signal transmission stage and the synchronous detection stage at least one programmable phase shift $\tau p(n)$ tied to the value of the acoustic phase shift $\phi(n)+\phi ref$ determined by synchronous detection carried out at the time of the preceding iteration of order n on the signal previously transmitted and which is equal to firstly the sum of the phase difference $\phi err(n)$ between the phase of the signal sampled at the time of the preceding iteration of order n and the phase of the reference signal, and secondly of the programmable phase shift introduced during the iteration of order n, $2\pi Fac\tau p(n-1)$ where Fac represents the frequency of the acoustic signal and $\tau p(n-1)$ represents a programmable delay determined at the iteration of order n-1 so that the synchronous detection stage of the iteration of order n+1 determines a phase difference $\phi err(n+1)$ between the phase of the sampled signal at the time of the current iteration and the phase difference which is as close as possible to zero, the acoustic phase shift $\phi(n+1)+\phi ref$ thus being approximately equal to the programmable phase shift introduced at the time of the iteration of order n+1, $2\pi Fac\tau p(n)$.

2. Method according to claim 1, wherein the programmable phase shift is introduced during the stage for sampling into the sampling signal.

3. Method according to claim 1, wherein, during the synchronous detection stage, the digitalized signal is multiplied by reference signals having the respective shape of a reference sine and a cosine having the reference phase, the programmable phase shift being introduced into the reference sine and cosine.

4. Method according to claim 1, wherein the programmable phase shift is introduced during the transmission stage into a transmission signal intended to generate the corresponding acoustic signal.

5. Method according to claim 1, wherein each acoustic signal received is mixed with a mixing signal so as to obtain a mixed signal whose frequency is reduced with respect to the frequency of said acoustic signal, the programmable phase shift being introduced into the mixing signal.

6. Method according to claim 1, wherein the programmable phase shift is broken down into at least two programmable sub-phase shifts each introduced into the signal in a separate stage between the stage for transmitting the acoustic signal and the synchronous detection stage.

7. Method according to claim 6, wherein each programmable sub-phase shift is determined by carrying out the Euclidean division of the programmable phase shift with respect to the modulus of the resolution of the programmable phase shifter associated with the corresponding stage in which said sub-phase shift is to be introduced.

8. Method according to claim 6, wherein the programmable phase shift is broken down into two programmable sub-phase shifts respectively introduced into the sampling signal and into the reference sine and cosine.

9. Method according to claim 1, wherein the sampling frequency Fe is equal to 4Fac/2n+1 where Fac represents the frequency of the acoustic signal and n is a whole number greater than or equal to zero.

10. Method according to claim 9, wherein the sampling frequency Fe is equal to 4Fac.

11. Method according to claim 10, wherein the programmable phase shift is approximately equal to $m(Fac/Fq)360°+k(Fac/Fe)360°$ where $(Fac/Fq)360°$ represents the resolution of the programmable phase shifter associated with the reference sine and cosine and $(Fac/Fe)360°$ represents the resolution due to the sampling, Fq representing the frequency of the quartz of the clock.

12. Method according to claim 9, wherein the sampling frequency Fe is equal to 4Fac/2n+1 with n strictly greater than zero.

13. Method according to claim 1, wherein the sampling and digitalization stages are carried out simultaneously.

14. Method according to claims 1, wherein the fluid flow rate is expressed according to the ratio of a first term which is equal to firstly the sum of $2\pi[Fac(T2-T1)]$ where [x] denotes the whole portion of x and where T1 and T2 are the respective propagation times of the acoustic signals transmitted in the two propagation directions, Fac being the frequency of the acoustic signals, and secondly of the difference of the acoustic phase shifts induced in each signal on a second term which is equal to the product of said propagation times, the propagation times being measured by a different method for each of the terms.

15. Method according to claim 14, wherein the propagation times of acoustic signals are measured in the first term more frequently than for those of the second term.

16. Method according to claim 15, wherein the propagation times of the acoustic signals are measured in the second term when the average of the propagation times transmitted in the two directions of propagation and expressed in the first term exceed a predetermined threshold.

17. Method according to claims 16, wherein the propagation times of the acoustic signals are measured in the second term when the first of the two conditions is satisfied.

18. Method according to claim 15, wherein the propagation times of the acoustic signals are measured in the second term when the number of acoustic phase shift measurements reaches a maximum predetermined number.

19. Method according to claim 14, wherein, so as to measure the propagation time of the acoustic signals transmitted in the two directions of propagation in the first term, for each signal, said signal received is adjusted, the envelope of said signal is shaped and said propagation time is determined by marking the moment of passage of said envelope through a predetermined threshold.

20. Method according to claim 14, wherein, so as to measure the propagation time of the acoustic signals transmitted in the two directions of propagation in the second term, the values of the amplitudes of each of said acoustic signals at the sampled points are compared with a threshold value, the first sampled point of the signal is looked for and whose value is greater than said threshold value and, on the basis of this point, the next one or the last passage to zero of this signal is looked for which thus determines the propagation time of said acoustic signal at an almost constant time which is the same for the two propagation times.

21. Method according to claim 20, wherein, so as to look for the next passage to zero of the signal, the two following consecutive sampled points are looked for which frame the point of the signal whose amplitude value is nil and then a straight-line interpolation is carried out between these two points so as to determine the propagation time of the acoustic signal.

22. Method according to claim 1, wherein on each iteration of order n, added to the programmable delay $\tau p(n)$ is an additional programmable delay $R(n)$ which shall induce on several successive iterations a phase error E due to the folding of harmonic lines after sampling distributed according to a nil average periodic law.

23. Method according to claim 22, wherein the additional programmable delay varies between 0 and the sampling period.

24. Method according to claim 23, wherein the values of the additional programmable delay vary linearly by steps equal to one fraction of the sampling period.

* * * * *